(12) United States Patent
Martin et al.

(10) Patent No.: US 12,279,129 B2
(45) Date of Patent: Apr. 15, 2025

(54) AUTOMATED DESIGN, INSTALLATION AND VALIDATION OF A WIRELESS NETWORK

(71) Applicant: Shasta Cloud, Inc., Carmel, CA (US)

(72) Inventors: Steve A. Martin, Carmel, CA (US); Doron Givoni, San Jose, CA (US)

(73) Assignee: Shasta Cloud, Inc., Carmel, CA (US)

( * ) Notice: Subject to any disclaimer, the term of this patent is extended or adjusted under 35 U.S.C. 154(b) by 402 days.

(21) Appl. No.: 17/942,124

(22) Filed: Sep. 10, 2022

(65) Prior Publication Data

US 2023/0180019 A1 Jun. 8, 2023

Related U.S. Application Data

(63) Continuation-in-part of application No. 17/743,404, filed on May 12, 2022.

(60) Provisional application No. 63/286,954, filed on Dec. 7, 2021.

(51) Int. Cl.
*H04W 16/18* (2009.01)
*H04W 24/02* (2009.01)
*H04W 24/06* (2009.01)

(52) U.S. Cl.
CPC .......... *H04W 16/18* (2013.01); *H04W 24/02* (2013.01); *H04W 24/06* (2013.01)

(58) Field of Classification Search
CPC . H04B 17/3912; H04B 17/373; H04W 16/18; H04W 24/02; H04W 24/06
See application file for complete search history.

(56) References Cited

U.S. PATENT DOCUMENTS

2016/0379370 A1* 12/2016 Nakazato ................. G06T 7/50
382/103
2018/0120793 A1* 5/2018 Tiwari ................... G06Q 10/04

* cited by examiner

*Primary Examiner* — Natasha W Cosme
(74) *Attorney, Agent, or Firm* — Steven Stupp

(57) ABSTRACT

An electronic device that provides installation instructions is described. During operation, the electronic device may automatically generate a radio-frequency project plan for a network in an environment using a radio-frequency model and a model corresponding to at least a portion of the environment. Then, based at least in part on the radio-frequency project plan, the electronic device may interactively provide the installation instructions to an installer while a given access point in the access points is being installed in the environment. Moreover, after the given access point is installed, the electronic device may validate the given access point. Next, the electronic device may perform automatic testing of the given access point. Furthermore, the electronic device may provide a comparison of estimated communication performance of the given access point in the radio-frequency project plan and measured communication performance of the given access point.

20 Claims, 20 Drawing Sheets

AUTOMATED DESIGN, INSTALLATION AND VALIDATION OF A WIRELESS NETWORK

CROSS REFERENCE TO RELATED APPLICATIONS

This application is a continuation in-part of U.S. Nonprovisional application Ser. No. 17/743,404, "Parameter Determination for Radio-Frequency Modeling," filed on May 12, 2022, by Steve A. Martin et al., which claims priority under 35 U.S.C. 119(e) to: U.S. Provisional Application Ser. No. 63/286,954, "Parameter Determination for Radio-Frequency Modeling," filed on Dec. 7, 2021, by Steve A. Martin et al., the contents of both of which are herein incorporated by reference.

FIELD

The described embodiments relate to techniques for installing and performing initial testing of a network during an installation process.

BACKGROUND

Many existing approaches for designing, deploying and verifying the desired communication performance of a wireless network are centered on a wireless site survey conducted by a certified expert or surveyor. Notably, the surveyor may study an environment or a facility where a wireless network is to be deployed in order to understand a customer's requirements, to assess the radio-frequency characteristics of the environment (such as coverage areas, radio-frequency interference, multipath distortion, hidden nodes, wireless signal strength, etc.), and to determine the number and the appropriate placement of wireless infrastructure (such as hardware and/or software, e.g., access points). Typically, during a wireless site survey, the surveyor may: define customer requirements; identify coverage areas and user density; determine locations of the wireless infrastructure; and verify that the resulting wireless network provides the desired communication performance.

However, these existing approaches are typically complicated, time-consuming and expensive. For example, because a professional surveyor is typically used, there are often time delays in having the wireless site survey performed. Moreover, it is often difficult to obtain an electronic representation that specifies the physical layout of a building, such as the floor plan (and, even when a floor plan is available, it is usually restricted to two-dimensional or 2D information). Furthermore, because the electronic representation is usually needed in order to determine the number and the locations of the wireless infrastructure, the design process is typically iterative. Additionally, because differences between the expected communication performance and the actual communication performance (such as wireless signal strengths, data rates, throughput, etc.) occur, the operations in the wireless site survey often need to be repeated. These problems are frustrating to the providers of the wireless infrastructure and their customers.

SUMMARY

An electronic device that provides installation instructions is described. This electronic device includes: an interface circuit, memory storing program instructions, a display and a computation device (such as a processor) that executes the program instructions. During operation, the electronic device automatically generates a radio-frequency project plan for a network in an environment using a radio-frequency model and a model corresponding to at least a portion of the environment, where the radio-frequency project plan includes a number of access points, types of the access points and locations of the access points in the environment, and where the model specifies a two-dimensional (2D) or three-dimensional (3D) geometric layout of the environment and/or estimated parameters associated with radio-frequency properties of at least the portion of the environment. Then, based at least in part on the radio-frequency project plan, the electronic device interactively provides the installation instructions to an installer while a given access point in the access points is being installed in the environment, where providing the instructions includes providing a digital representation of at least a portion of the environment proximate to a given location in the locations of the given access point. Moreover, after the given access point is installed, the electronic device validates the given access point, where the validating includes validating the given location and an orientation of the given access point. Next, the electronic device performs automatic testing of the given access point, where the automatic testing includes testing communication performance of the given access point. Furthermore, the electronic device provides a comparison of estimated communication performance of the given access point in the radio-frequency project plan and measured communication performance of the given access point, where providing the comparison includes providing a visual representation of the comparison, and the estimated communication performance is based at least in part on the radio-frequency project plan.

Moreover, the electronic device may dynamically update and provide a visual representation of estimated communication performance based at least in part on one or more proposed changes to the given location and/or the network. Notably, the changes may include receiving user-interface instructions that indicate a change to the given location in the digital representation (e.g., a user dragging and moving the given location in the digital representation). Alternatively or additionally, the one or more proposed changes may include receiving an instruction to switch from wired backhaul to wireless backhaul, e.g., using a mesh network. Note that the estimated communication performance may be computed in real time based at least in part on the one or more proposed changes to the given location and/or the network.

In some embodiments, the radio-frequency project plan is automatically generated and/or the estimated communication performance is computed by a computer system that communicates with the electronic device.

Furthermore, performing the automatic testing may include dynamically generating test scripts for the testing. Alternatively or additionally, performing the automatic testing may include selecting a test script from sets of predefined test scripts. Note that the test script may be dynamically generated or selected based at least in part on design goals for the network, a type of application to be used with the network, a deviation from the radio-frequency project plan and/or a deviation from the estimated communication performance.

Additionally, the estimated communication performance may be guaranteed based at least in part on the radio-frequency project plan.

In some embodiments, the electronic device may dynamically update the model based at least in part on the comparison. Note that the model may be dynamically updated by the computer system that communicates with the electronic device.

Another embodiment provides a computer-readable storage medium with program instructions for use with the electronic device or the computer system. When executed by the electronic device or the computer system, the program instructions cause the electronic device or the computer system to perform at least some of the aforementioned operations and/or counterpart operations in one or more of the preceding embodiments.

Another embodiment provides a method, which may be performed by the electronic device or the computer system. This method includes at least some of the aforementioned operations and/or counterpart operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

DRAWINGS

Note that like reference numerals refer to corresponding parts throughout the drawings. Moreover, multiple instances of the same part are designated by a common prefix separated from an instance number by a dash.

DETAILED DESCRIPTION

Figure 1:
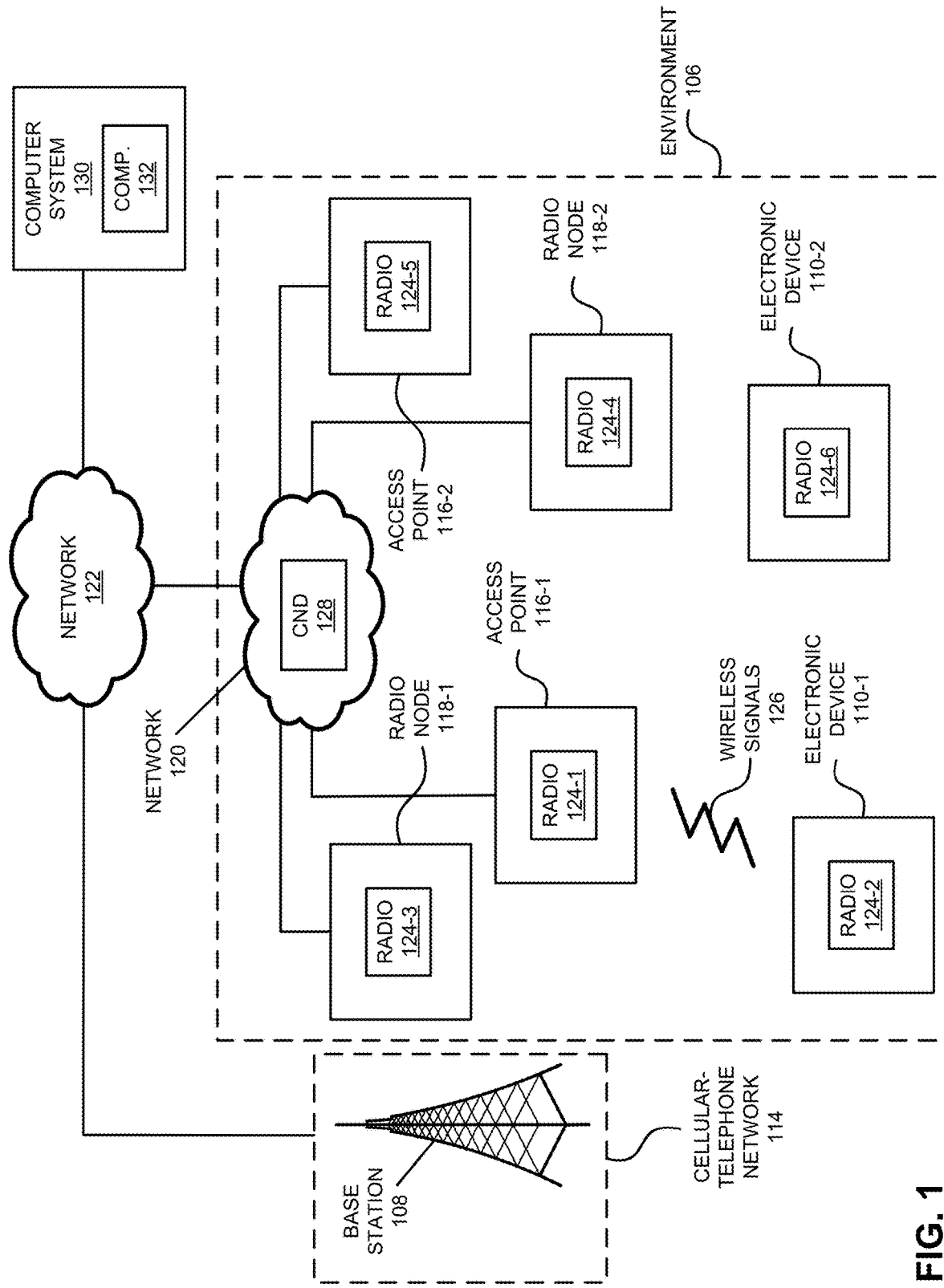
FIG. 1 is a block diagram illustrating an example of communication among electronic devices in accordance with an embodiment of the present disclosure.

An electronic device that provides installation instructions is described. During operation, the electronic device may automatically generate a radio-frequency project plan for a network in an environment using a radio-frequency model and a model corresponding to at least a portion of the environment. Then, based at least in part on the radio-frequency project plan, the electronic device may interactively provide the installation instructions to an installer while a given access point in the access points is being installed in the environment. Moreover, after the given access point is installed, the electronic device may validate the given access point. Next, the electronic device may perform automatic testing of the given access point. Furthermore, the electronic device may provide a comparison of estimated communication performance of the given access point in the radio-frequency project plan and measured communication performance of the given access point.

By providing the interactive instructions, and validating and testing the network, the disclosed installation techniques may simplify an installation process, thereby reducing the time and cost of installing the network. Moreover, the testing of the network may be customized to the given access point and/or the network. For example, the test script may be dynamically generated or selected based at least in part on design goals for the network, a type of application to be used with the network, a deviation from the radio-frequency project plan and/or a deviation from the estimated communication performance. This capability may ensure that the measured communication performance meets a guaranteed communication performance for the network, or to allow a remedial action to be performed (such as replacing the given access point) if the measured communication performance does not initially meet the guaranteed communication performance for the network. Moreover, the installation techniques may reduce or eliminate the need for domain expertise in order to install and test the network. Consequently, the installation techniques may improve the user experience when designing, implementing and/or using networks, such as wireless networks.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth or Bluetooth low energy or BLE (from the Bluetooth Special Interest Group of Kirkland, Washington), a cellular-telephone network or data network communication protocol (such as a third generation or 3G communication protocol, a fourth generation or 4G communication protocol, e.g., Long Term Evolution or LTE (from the $3^{rd}$ Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer or computer system using a wired communication protocol, such as a wired communication protocol that is compatible with an IEEE 802.3 standard (which is sometimes referred to as 'Ethernet'), e.g., an Ethernet II standard and/or another type of wired interface. However, a wide variety of communication protocols may be used in the system, including wired and/or wireless communication. In the discussion that follows, Wi-Fi and Ethernet are used as illustrative examples.

We now describe some embodiments of the disclosed techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a wireless local area network (WLAN) and/or one or more radio nodes 118 (which may communicate using LTE or a 5G cellular-telephone communication protocol) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other, a computer system 130 and/or an optional controller 112 (which may be a local or a cloud-based controller that manages and/or configures access points 116, radio nodes 118 and/or a computer network device or CND 128, such as a switch or a router) using a wired communication protocol (such as Ethernet) via network 120 and/or 122. Moreover, computer system 130 may include one or more computers 132. However, in some embodiments, access points 116 and/or radio nodes 118 may communicate with each other and/or the controller using wireless communication (such as Wi-Fi, Bluetooth and/or another wireless communication protocols), e.g., one of access points 116 may be a mesh access point in a mesh network. Note that networks 120 and 122 may be the same or different networks. For example, networks 120 and/or 122 may an LAN, an intra-net or the Internet. In some embodiments, wireless communication between at least pairs of components in FIG. 1 involves the use of dedicated connections, such as via a peer-to-peer (P2P) communication technique.

Figure 20:
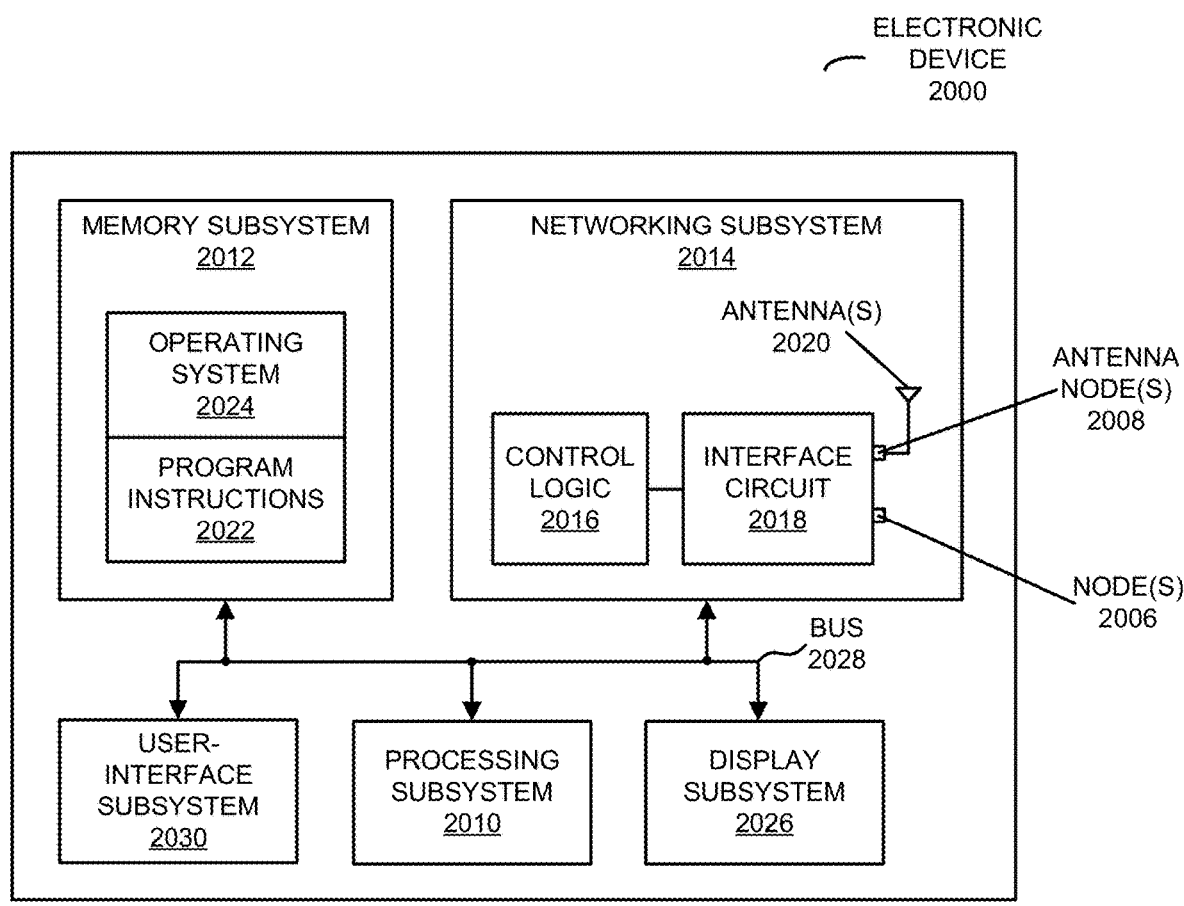
FIG. 20 is a block diagram illustrating an example of an electronic device in accordance with an embodiment of the present disclosure.

As described further below with reference to FIG. 20, electronic devices 110, controller 112, access points 116, radio nodes 118, computer network device 128, and computer system 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data or management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 7 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA) and/or multiple-input multiple-output (MIMO).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be difficult to design a wireless network. Moreover, as discussed below with reference to FIGS. 2-5, these problems may be addressed using the wireless-network design techniques. Note that while environment 106 is illustrated in FIG. 1 with wireless-network components or computer network devices and a wireless network, in other embodiments these components and the wireless network may not exist prior to performing of the wireless-network design techniques.

During the wireless-network design techniques, one of electronic devices 110 (such as electronic device 110-1) may perform, using a sensor, measurements associated with environment 106, such as a building or a structure. For example, performing the measurements may include providing an instruction for a user to move through environment 106 with electronic device 110-1 while the measurements are performed using the sensor. Alternatively, during the measurements, electronic device 110-1 may automatically move through environment 106. Note that the sensor may include: an image sensor in a visible band of frequencies, a radar sensor, a LiDAR sensor, a radio-frequency receiver and/or another type of sensor. Moreover, the measurements include images of environment 106 and content in at least some of the images may overlap. In some embodiments, the images may provide a comprehensive set of views of environment 106. However, when there is missing content associated with environment 106, electronic device 110-1 may provide an instruction for the user to position the sensor (or electronic device 110-1) in the environment so that the missing content can be measured.

Furthermore, electronic device 110-1 may determine its location, perspective and/or orientation while the measurements are performed. For example, electronic device 110-1 may determine the absolute and/or relative location using: the strength of wireless signals from predefined or predetermined locations associated with a wireless network (such as a location of access point 116-1, a location of radio node 118-1 and/or a location of base station 108); a local positioning system; and/or a Global Positioning System.

Then, electronic device 110-1 may create a model that represents environment 106, where the model specifies a 2D a 3D geometric layout of environment 106 and/or estimated parameters associated with radio-frequency properties of at least a portion of environment 106 (such as a portion of a building, e.g., a floor, a wall, a ceiling, etc.). Note that in some embodiments the model may characterize a communication performance of an existing wireless network in or proximate to the environment.

In some embodiments, creating the model may include providing, to computer system 130, information specifying the measurements, the location(s) of electronic device 110-1, the perspective of electronic device 110-1 and/or the orientation(s) of electronic device 110-1. Then, computer system 13 may create or generate the model based at least in part on the information, and may provide, to electronic device 110-1, the model. Alternatively or additionally, creating the model may include may include electronic device 1101—automatically generating the model based at least in part on the information.

For example, the information may be input to a pretrained predictive model (such as a neural network and/or a machine-learning model), which may output the model. Moreover, the output may specify the estimated parameters by identifying a type of structure (such as a wooden building or a concrete and steel building) in environment 106. Furthermore, the estimated parameters may be determined by providing the 2D or 3D geometric layout and the identified type of structure to a second pretrained predictive model (such as a second neural network and/or a second machine-learning model), which may output the estimated parameters. Additionally, the measurements may include images of environment 106, and creating the model may include analyzing the images using an image-analysis technique.

Note that the model may include a floor plan of environment 106 and the parameters may be associated with one or more walls, one or more floors and/or one or more ceilings in environment 106. In some embodiments, the model is based at least in part on: an existing 2D floor plan of environment 106 (which may be accessed or obtained by electronic device 110-1 based at least in part on a location of electronic device 110-1 and/or the identified type of structure); and/or one or more images of an exterior of environment 106 (such as an exterior of a building, which may indicate a number of floors, a 2D geometry of a floor, etc.).

In some embodiments, the estimated parameters may include: a type of material a dielectric constant in the band of frequencies, a permittivity in the band of frequencies, a conductivity in the band of frequencies, a thickness (such as the thickness of a wall), spatial variation in the estimated parameters (such as a standard deviation), and/or average or mean values of the estimated parameters.

Moreover, electronic device 110-1 may design a wireless network for use in environment 106, where the designing includes determining radio-frequency characteristics in a band of frequencies associated with the wireless network based at least in part on the model, and the wireless network is predicted to achieve one or more target communication-performance metrics (such as an RSSI, a throughput, etc.). For example, the wireless network may be predicted to be within a predefined range (such as 10%, 15%, 20%, 25%, 30% or 50%) of the one or more target communication-performance metrics. Note that the one or more target communication-performance metrics may be directly or indirectly specified by the user, such as based at least in part on a request for a 'high density deployment with high performance.' The designing may be performed by providing, to computer system 130, the model and the one or more target communication-performance metrics. In response, computer system 130 may performs the radio-frequency simulations based at least in part on the model and the one or more target communication-performance metrics. Using the radio-frequency simulations, computer system 130 may confirm that the design is predicted to achieve (e.g., within the predefined range) the one or more target communication-performance metrics. In some embodiments, the design may include a comparison of the predicted communication performance of the wireless network with the communication performance of an existing wireless network in or proximate to the environment. Alternatively or additionally, the communication performance of the design may be compared to other networks (such as the communication performance of a mesh-link versus a cable link). Then, computer system 130 may provide, to electronic device 110-1, the design information.

Furthermore, determining the radio-frequency characteristics may include performing radio-frequency simulations and/or using a third pretrained predictive model (such as a third neural network and/or a third machine-learning model). For example, the radio-frequency characteristics may be determined by inputting the model to the third pretrained model, which may output the radio-frequency characteristics. Additionally, the designing may include computing the design information using a fourth pretrained model (such as a fourth neural network and/or a fourth machine-learning model). For example, the model and the radio-frequency characteristics may be input to the fourth pretrained model, which may output the design information. In some embodiments, the creating and/or the designing may be based at least in part on a second model associated with a different environment (e.g., a 2D a 3D geometric layout of a different environment than environment 106 and/or estimated parameters associated with radio-frequency properties of at least a portion of the different environment) and/or second design information associated with a third wireless network in the different environment.

Next, electronic device 110-1 may provide the design information associated with the design that specifies the wireless network, where the design information includes one or more wireless-network components (such as a number of access points 116, a type of access point, etc.) and one or more locations of the wireless-network components in environment 106. For example, the design information may displayed or printed out by electronic device 110-1, stored in memory associated with electronic device 110-1, or provided to another computer (not shown).

As described further below with reference to FIGS. 6-7, computer system 130 may perform the analysis techniques to facilitate dynamic or continuous learning. For example, a pretrained predictive model (such as a neural network or a machine-learning model) may be dynamically updated and then used in the wireless-network design techniques.

Notably, computer system 130 may receive feedback, from electronic device 110-1, about performance of the pretrained predictive model, where the pretrained predictive model predicts one or more communication-performance metrics of a wireless network (e.g., based at least in part on a model of a geometric layout and/or estimated parameters associated with radio-frequency properties of at least a portion of environment 106 of the wireless network). Note that the feedback may be associated with an accuracy of the predictions. Then, computer system 130 may dynamically update the pretrained predictive model based at least in part on the feedback. For example, updating the pretrained predictive model may include retraining the pretrained predictive model. After updating the pretrained predictive model, computer system 130 may optionally provide the updated the pretrained predictive model to electronic device 110-1 for use in the wireless-network design techniques.

In some embodiments, computer system 130 may provide, to electronic device 110-1, a recommendation based at least in part on the feedback and/or the updated pretrained predictive model, where the recommendation includes a modification to the wireless network to improve a communication-performance metric of the wireless network. For example, the modification may include using a different type of access point and/or changing a location of an access point (such as access point 116-1).

Note that the updated pretrained predictive model may facilitate one-shot or one-pass (i.e., without iteration) predictions of the one or more communication-performance metrics of a future wireless-network design associated with a different environment, where the predicted one or more communication-performance metrics are within a predefined range of measurements of the one or more communication-performance metrics for the third wireless network and/or of target values of the one or more communication-performance metrics for the third wireless network.

As described further below with reference to FIGS. 8-9, electronic device 110-1 may perform the presentation techniques to provide a visual representation of radio-frequency performance and/or one or more communication-performance metrics of a wireless network in environment 106. Notably, during the presentation techniques, electronic device 110-1 may obtain information specifying the radio-frequency performance and/or the one or more communication-performance metrics as a function of location in at least a portion of environment 106. Note that obtaining the information may include electronic device 110-1 measuring the radio-frequency performance and/or the one or more communication-performance metrics as a function of the location in at least the portion of environment 106. In some embodiments, obtaining the information includes estimating or simulating the radio-frequency performance and/or the one or more communication-performance metrics as the function of location in at least a second portion of environment 106, which may at least in part be different from the portion of environment 106.

Then, electronic device 110-1 may provide the visual representation, e.g., on a display, or using augmented reality or virtual reality. Moreover, in some embodiments, the representation may include an immersive graphical representation of the radio-frequency performance and/or the one or more communication-performance metrics, such as dynamically varying 3D (e.g., sinusoidal) patterns corresponding to the received signal strength. Note that as the user moves in environment 106, electronic device 110-1 may update the visual representation as the radio-frequency performance and/or the one or more communication-performance metrics vary.

Furthermore, electronic device 110-1 may receive user-interface activity (such as activation or clicking on a user-interface icon, receiving a verbal command, a mouse click, tapping on a keyboard key, etc.) specifying a proposed change associated with a wireless-network component in the wireless network, such as a location and/or a type of the wireless-network component in environment 106. In response, electronic device 110-1 may predict an impact of the proposed change. In some embodiments, the impact is predicted using a pretrained predictive model (such as a neural network or a machine-learning model). Alternatively or additionally, in some embodiments predicting the impact includes providing, to computer system 130, the proposed change and optionally a model of environment 106 (e.g., a model of a geometric layout and/or estimated parameters associated with radio-frequency properties of at least a portion of environment 106). After receiving the proposed change and optionally the model, computer system 130 may predict the impact. Then, computer system 130 may provide, to electronic device 110-1, the predicted impact. Next, the electronic device may update the provided visual representation to reflect the predicted impact of the proposed change. Note that the updated visual representation may include numerical values associated with different locations in environment 106 and/or a graphical representation to indicate the predicted impact.

In these ways, the disclosed techniques may provide: faster, cheaper and more accurate designs of wireless networks; more-accurate pretrained predictive models; and/or intuitive and interactive visual representations of the radio-frequency performance and/or the one or more communication-performance metrics. These capabilities may allow the disclosed techniques to improve the user experience when designing, implementing and/or using wireless networks.

As described further below with reference to FIGS. 10-11, electronic device 110-1 may perform the installation techniques. Notably, electronic device 110-1 may automatically generates a radio-frequency project plan for a network in environment 106 using a radio-frequency model and a model corresponding to at least a portion of environment 106, where the radio-frequency project plan includes a number of access points 116, types of access points 116 and locations of access points 116 in environment 106, and where the model specifies a 2D or 3D geometric layout of environment 106 and/or estimated parameters associated with radio-frequency properties of at least the portion of environment 106. Then, based at least in part on the radio-frequency project plan, electronic device 110-1 may interactively provide the installation instructions to an installer while a given access point (such as access point 116-1) in access points 116 is being installed in environment 106, where providing the instructions includes providing a digital representation of at least a portion of environment 106 proximate to a given location in the locations of access point 116-1. For example, the installation instructions may indicate the given location and may guide the installer through the installation of access point 116, and electronic device 110-1 may display the digital representation (such as using augmented reality) on a display in electronic device 110-1.

Moreover, after access point 116-1 is installed, electronic device 110-1 may validate access point 116-1, where the validating includes validating the given location and an orientation (such as upside down vs. sideways) of access point 116-1.

Next, electronic device 110-1 performs automatic testing of access point 116-1, where the automatic testing includes testing communication performance of access point 116-1, such as bandwidth, throughput, latency, jitter, etc. For example, performing the automatic testing may include electronic device 110-1 dynamically generating test scripts for the testing. Alternatively or additionally, performing the automatic testing may include electronic device 110-1 selecting a test script from sets of predefined test scripts. Note that the test script may be dynamically generated or selected based at least in part on design goals for the network (such as high density), a type of application to be used with the network (such as a Metaverse application, real-time interactive gaming, or an augmented reality or a virtual reality gaming application), a deviation from the radio-frequency project plan and/or a deviation from the estimated communication performance. In some embodiments, electronic device 110-1 may acquire parameters (such as a password and/or a service set identifier) of an existing network (such as a WLAN) in environment 106, which may be used in the testing (such as to compare the communication performance of the network with the existing network).

Furthermore, electronic device 110-1 may provide a comparison of estimated communication performance of access point 116-1 in the radio-frequency project plan and measured communication performance of access point 116-1, where providing the comparison includes providing a visual representation of the comparison (e.g., on the display), and the estimated communication performance is based at least in part on the radio-frequency project plan.

In some embodiments, electronic device 110-1 may dynamically update and provide a visual representation of estimated communication performance (e.g., on the display) based at least in part on one or more proposed changes to the given location and/or the network. Notably, the changes may be received from the installer. For example, electronic device 110-1 may receive user-interface instructions that indicate a change to the given location in the digital representation (e.g., the installer may drag and move the given location in the digital representation). Alternatively or additionally, the one or more proposed changes may include electronic device 110-1 receiving an instruction (e.g., from the installer) to switch from wired backhaul to wireless backhaul, e.g., using a mesh network, or to use different equipment in the network (such as based at least in part on available equipment during the installation process, e.g., when a cable is not available or a type of access point that is available). Note that the estimated communication performance may be computed by electronic device 110-1 in real time based at least in part on the one or more proposed changes to the given location and/or the network.

Additionally, the estimated communication performance may be guaranteed based at least in part on the radio-frequency project plan.

In some embodiments, electronic device 110-1 may dynamically update the model based at least in part on the comparison.

In these ways, the disclosed techniques may simplify the installation process, thereby reducing the time and cost of installing and testing the network. These capabilities may allow the disclosed techniques to improve the user experience when installing networks, such as wireless networks.

While the preceding embodiments illustrated the installation techniques as being performed by electronic device 110-1, in other embodiments at least some or a portion of some of the operations may be performed by computer system 130. For example, the radio-frequency project plan is automatically generated and/or the estimated communication performance may be computed by computer system 130, which then provides the radio-frequency project plan and/or the estimated communication performance is provided to electronic device 110-1. Alternatively or additionally, the model may be dynamically updated by computer system 130 based at least in part on the comparison, and then computer system 130 may communicate the updated model to electronic device 110-1.

While FIG. 1 illustrates electronic device 110-1 performing at least some of the operations in the techniques, in other embodiments one or more of the operations performed by electronic device 110-1 in the techniques may be performed by computer system 130. Alternatively or additionally, in some embodiments one or more of the operations performed by computer system 130 are performed by electronic device 110-1. Thus, in general, one or more operations in the techniques may be implemented in a centralized or a distributed manner.

Figure 2:
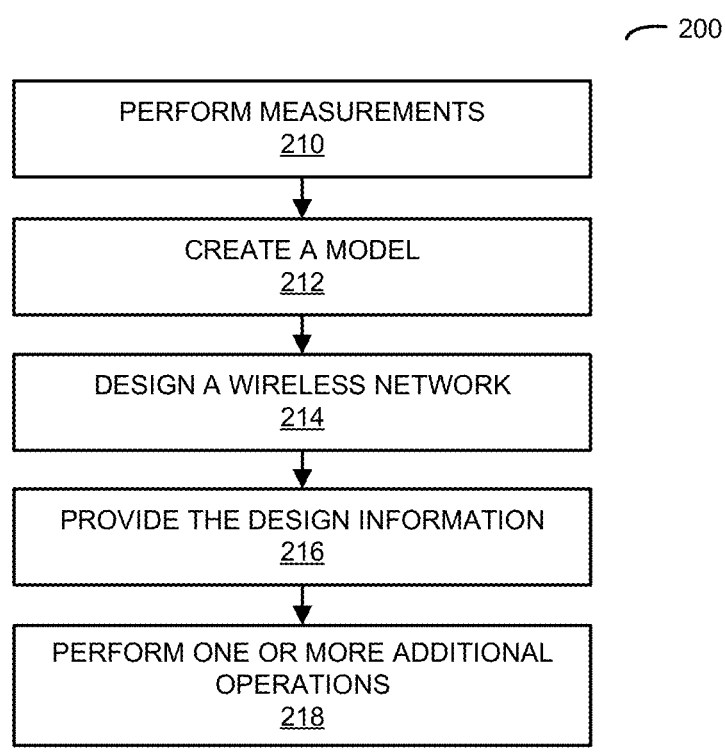
FIG. 2 is a flow diagram illustrating an example of a method for providing design information using an electronic device in FIG. 1 in accordance with an embodiment of the present disclosure.

We now describe embodiments of methods associated with the techniques. FIG. 2 presents a flow diagram illustrating an example of a method 200 for providing design information, which may be performed by an electronic device (such as electronic device 110-1 in FIG. 1). During operation, the electronic device may perform, using a sensor, measurements (operation 210) associated with an environment. Then, the electronic device may create a model (operation 212) that represents the environment, where the model specifies a 2D or a 3D geometric layout of the environment and/or estimated parameters associated with radio-frequency properties of at least a portion of the environment. Moreover, the electronic device may design a wireless network (operation 214) for use in the environment, where the designing includes determining radio-frequency characteristics in a band of frequencies associated with the wireless network based at least in part on the model, and the wireless network is predicted to achieve one or more target communication-performance metrics. Next, the electronic device may provide the design information (operation 216) associated with the design that specifies the wireless network, where the design information includes one or more wireless-network components (such as a number of access points, a type of access point, etc.) and one or more locations of the wireless-network components in the environment. In some embodiments, the electronic device optionally performs one or more additional operations (operation 218).

Figure 3:
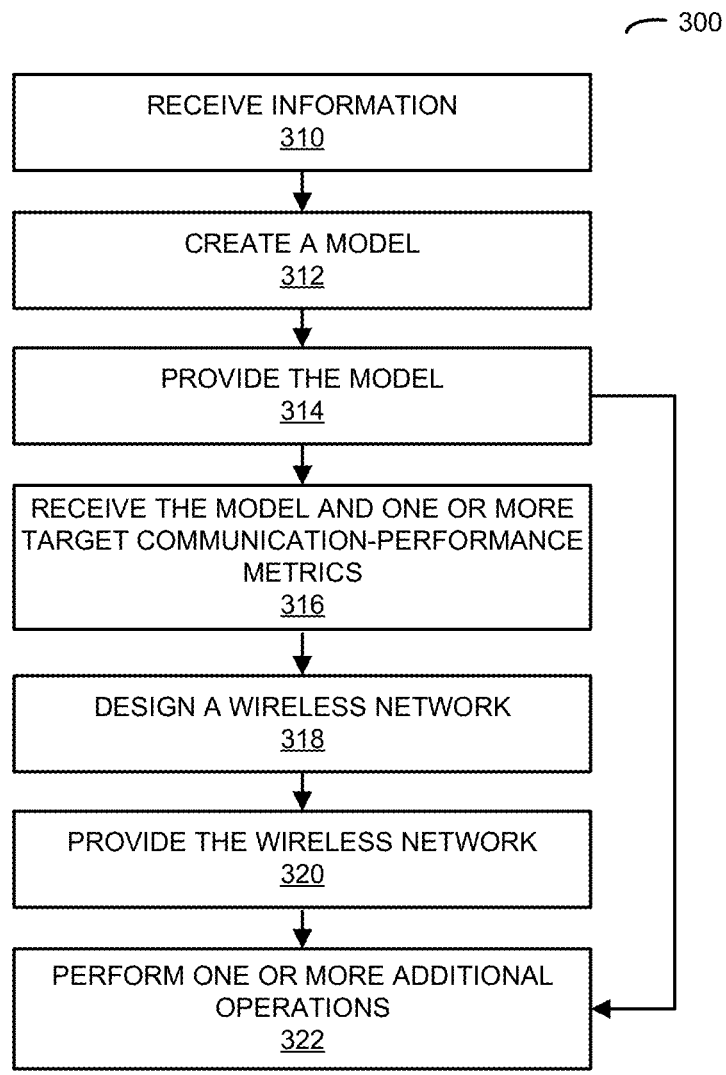
FIG. 3 is a flow diagram illustrating an example of a method for providing design information using a computer system in FIG. 1 in accordance with an embodiment of the present disclosure.

FIG. 3 presents a flow diagram illustrating an example of a method 300 for providing design information, which may be performed by a computer system (such as computer system 130 in FIG. 1). During operation, the computer system may receive, associated with an electronic device, information (operation 310) specifying the measurements, the location(s) of the electronic device, the perspective(s) of the electronic device and/or the orientation(s) of the electronic device. Then, the computer system may create a model (operation 312) that represents the environment, where the model specifies a 2D or a 3D geometric layout of the environment and/or estimated parameters associated with radio-frequency properties of at least a portion of the environment. Next, the computer system may provide, addressed to the electronic device the model (operation 314).

Alternatively or additionally, the computer system may receive, associated with the electronic device, the model and the one or more target communication-performance metrics (operation 316). In response, the computer system may design a wireless network (operation 318) for use in the environment, where the designing includes determining radio-frequency characteristics in a band of frequencies associated with the wireless network based at least in part on the model, and the wireless network is predicted to achieve the one or more target communication-performance metrics. Next, the computer system may provide, addressed to the electronic device, the design information (operation 320) associated with the design that specifies the wireless network, where the design information includes one or more wireless-network components (such as a number of access points, a type of access point, etc.) and one or more locations of the wireless-network components in the environment.

In some embodiments, the computer system optionally performs one or more additional operations (operation 322).

Figure 4:
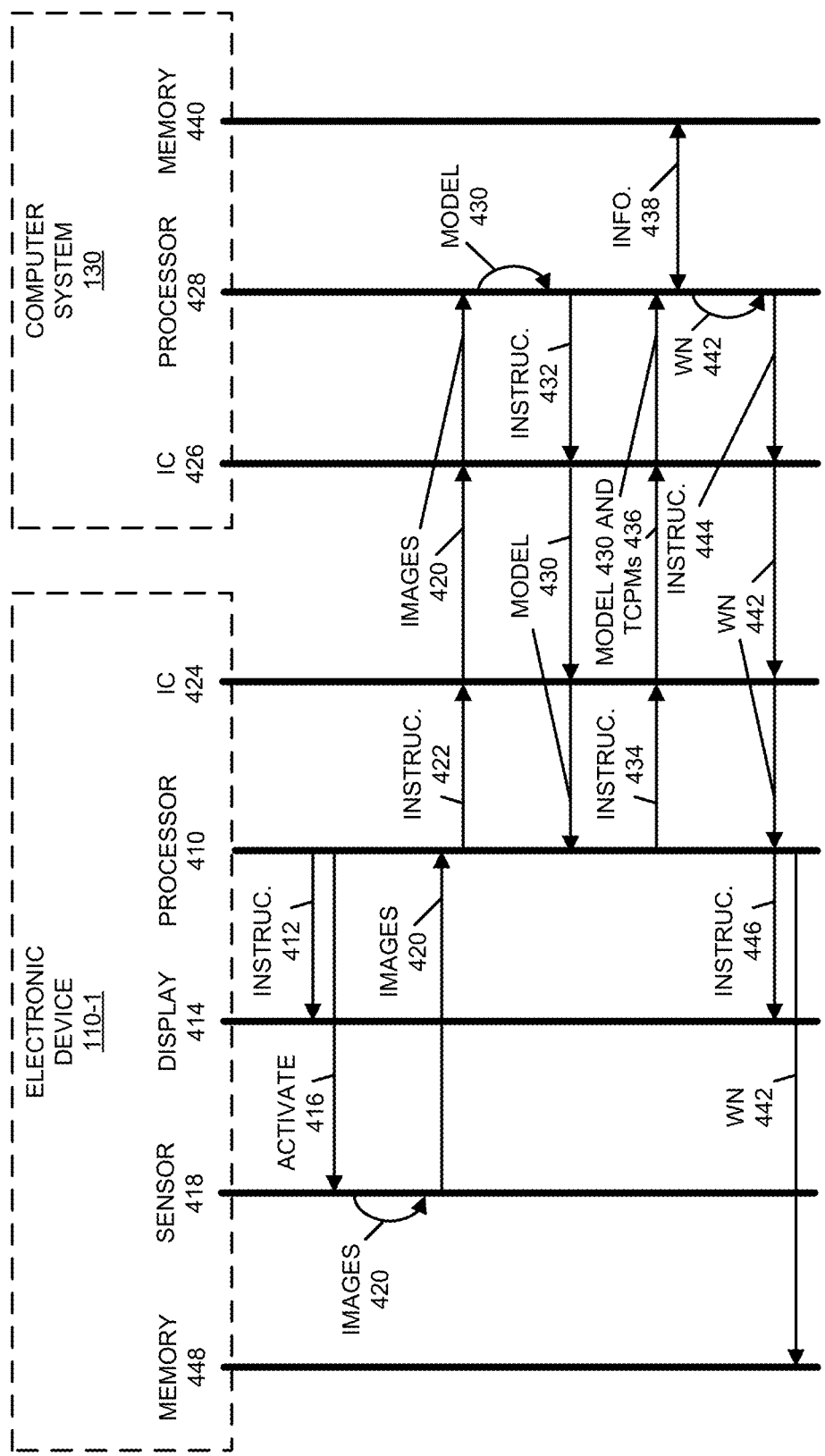
FIG. 4 is a drawing illustrating an example of communication between an electronic device and a computer system in FIG. 1 in accordance with an embodiment of the present disclosure.

Embodiments of the wireless-network design techniques are further illustrated in FIG. 4, which presents a drawing illustrating an example of communication among electronic device 110-1 and computer system 130. Notably, a processor 410 in electronic device 110-1 may provide an instruction 412 for display on a display 414 in electronic device 110-1 and may activate 416 a sensor 418 (such as a camera) in electronic device 110-1. Instruction 412 may indicate that user should use electronic device 110-1 to acquire images 420 of (and, more generally, measurements in) an environment, e.g., by moving through the environment and/or changing perspectives in the environment (such as by rotating around by 360°). After receiving images 420, processor 410 may instruct 422 an interface circuit (IC) 424 in electronic device 110-1 to provide images 420 (and optionally additional information, such as a location of electronic device 110-1, a perspective of electronic device 110-1 in the environment, e.g., a direction of a field of view of electronic device 110-1, and/or an orientation of electronic device 110-1) to computer system 130.

Moreover, after receiving images 420 (and the optional additional information), interface circuit 426 in computer system 130 may provide images 420 (and the optional additional information) to processor 428 in computer system 130. Then, processor 428 may create a model 430 of the environment, e.g., using a pretrained predictive model. Next, processor 428 may instruct 432 interface circuit 426 to provide model 430 to electronic device 110-1.

After receiving model 430, interface circuit 424 may provide model 430 to processor 410. Then, processor 410 may instruct 434 interface circuit 424 to provide model 430 and one or more target communication-performance metrics (TCPMs) 436 to computer system 130. Moreover, after receiving model 430 and the one or more target communication-performance metrics 436, interface circuit 426 may provide model 430 and the one or more target communication-performance metrics 436 to processor 428. In response, processor 428 may design a wireless network (WN) 442, e.g., using another pretrained predictive model. Note that processor 428 may design the wireless network 442 using optional information 438 stored in memory 440 in computer system 130. Next, processor 428 may instruct 444 interface circuit 426 to provide the design for the wireless network 442 to electronic device 110-1.

Furthermore, after receiving the design for the wireless network 442, interface circuit 424 may provide the design for the wireless network 442 to processor 410. In response, processor 410 may instruct 446 display 414 to present or display the design for the wireless network 442. Alternatively or additionally, processor 410 may store the design for the wireless network 442 in memory 448 in electronic device 110-1.

Figure 5:
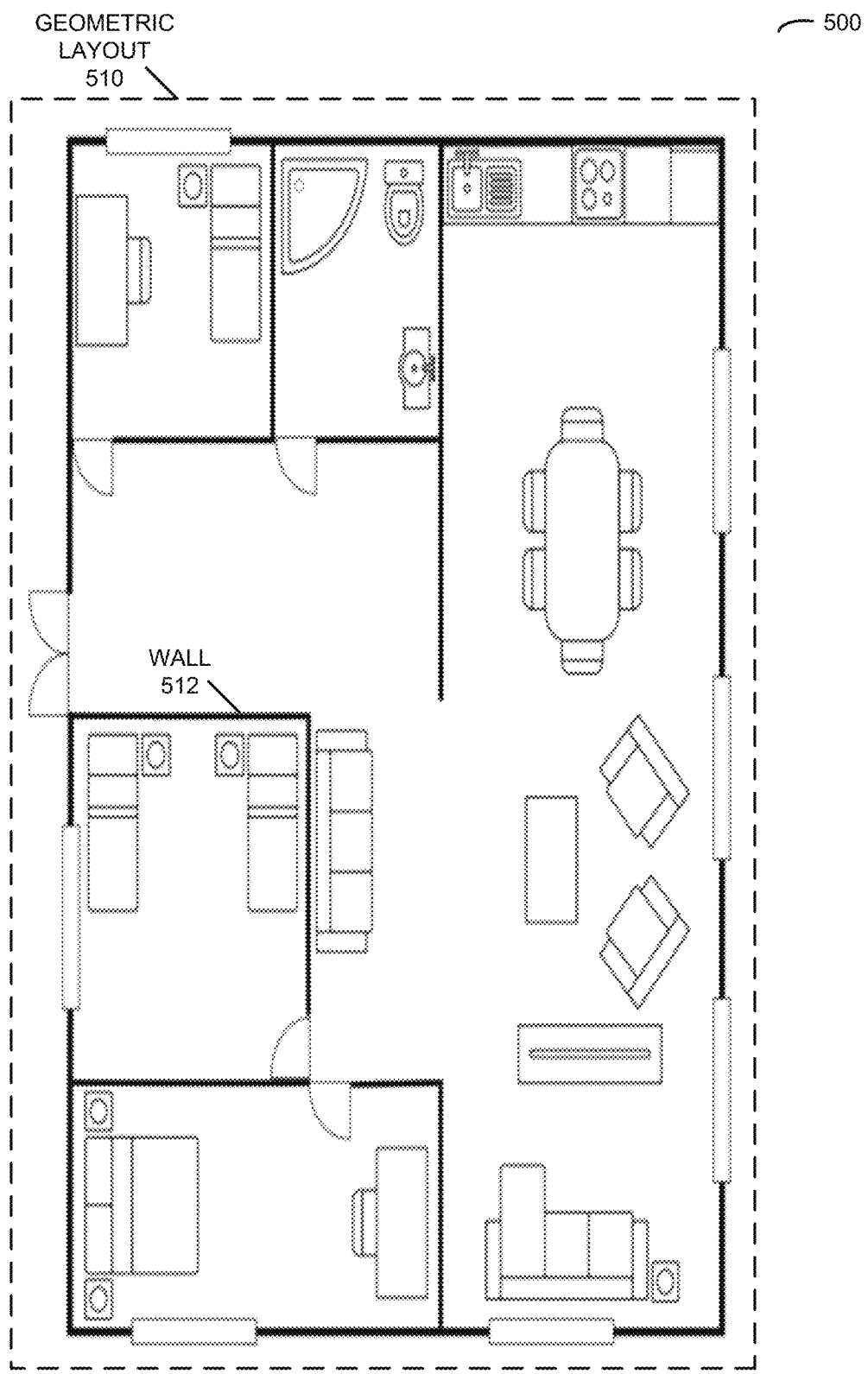
FIG. 5 is a drawing illustrating an example of a model of an environment in accordance with an embodiment of the present disclosure.

FIG. 5 presents a drawing illustrating an example of a model 500 of an environment. Notably, model 500 may specify a 2D or a 3D geometric layout 510 of the environment and/or estimated parameters associated with radio-frequency properties of at least a portion of the environment (such as a wall 512). Note that the estimated parameters may include: a type of material a dielectric constant in the band of frequencies, a permittivity in the band of frequencies, a conductivity in the band of frequencies, a thickness (such as the thickness of wall 512), spatial variation in the estimated parameters (such as a standard deviation), and/or average or mean values of the estimated parameters.

Figure 6:
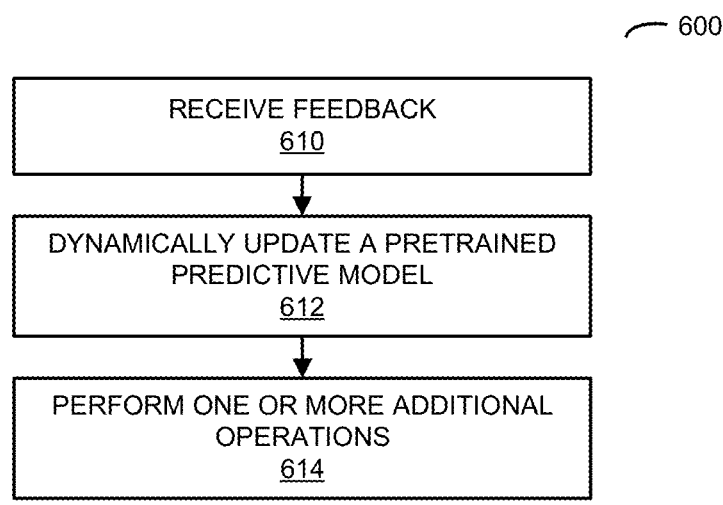
FIG. 6 is a flow diagram illustrating an example of a method for dynamically updating a pretrained predictive model using a computer system in FIG. 1 in accordance with an embodiment of the present disclosure.

FIG. 6 presents a flow diagram illustrating an example of a method 600 for dynamically updating a pretrained predictive model, which may be performed by a computer system (such as computer system 130 in FIG. 1). During operation, the computer system may receive feedback (operation 610), associated with an electronic device, about performance of the pretrained predictive model, where the pretrained predictive model predicts one or more communication-performance metrics of a wireless network (e.g., based at least in part on a model of a geometric layout and/or estimated parameters associated with radio-frequency properties of at least a portion of the environment of the wireless network), and the feedback is associated with an accuracy of the predictions. Then, the computer system may dynamically update the pretrained predictive model (operation 612) based at least in part on the feedback. In some embodiments, the computer system optionally performs one or more additional operations (operation 614).

Figure 7:
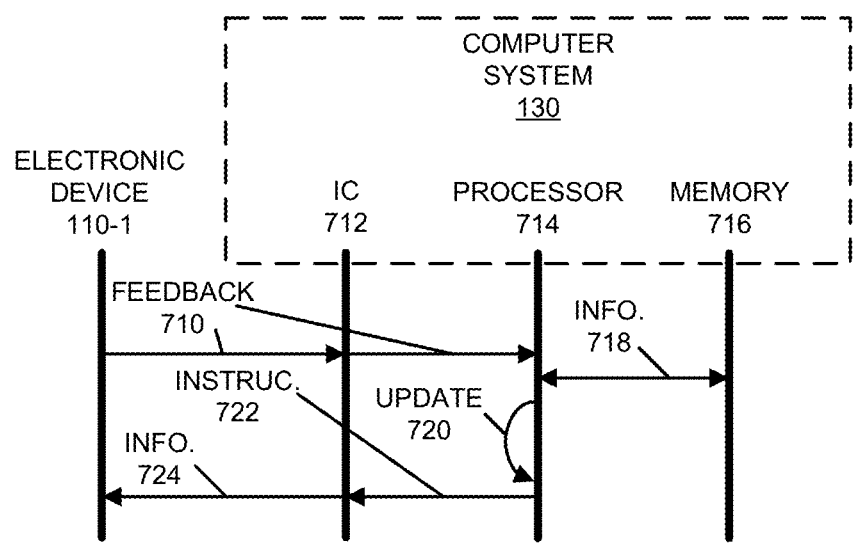
FIG. 7 is a drawing illustrating an example of communication between an electronic device and a computer system in FIG. 1 in accordance with an embodiment of the present disclosure.

Embodiments of the analysis techniques are further illustrated in FIG. 7, which presents a drawing illustrating an example of communication among electronic device 110-1 and computer system 130. Notably, electronic device 110-1 may provide feedback 710 about performance of a pretrained predictive model, where the pretrained predictive model predicts one or more communication-performance metrics of a wireless network (e.g., based at least in part on a model of a geometric layout and/or estimated parameters associated with radio-frequency properties of at least a portion of the environment of the wireless network), and feedback 710 is associated with an accuracy (qualitatively or quantitatively) of the predictions.

After receiving feedback 710, an interface circuit 712 in computer system 130 may provide feedback 710 to processor 714 in computer system 130. In response, processor 714 may access information 718 specifying a pretrained predictive model (such as hyperparameters and/or an architecture of the pretrained predictive model) in memory 716 in computer system 130. Then, processor 714 may dynamically update 720 the pretrained predictive model based at least in part on feedback 710.

In some embodiments, processor 714 may instruct 722 interface circuit 712 to provide information 724 specifying the updated pretrained predictive model to electronic device 110-1 for use in creating models of environments and/or designing wireless networks for use in the environments.

Figure 8:
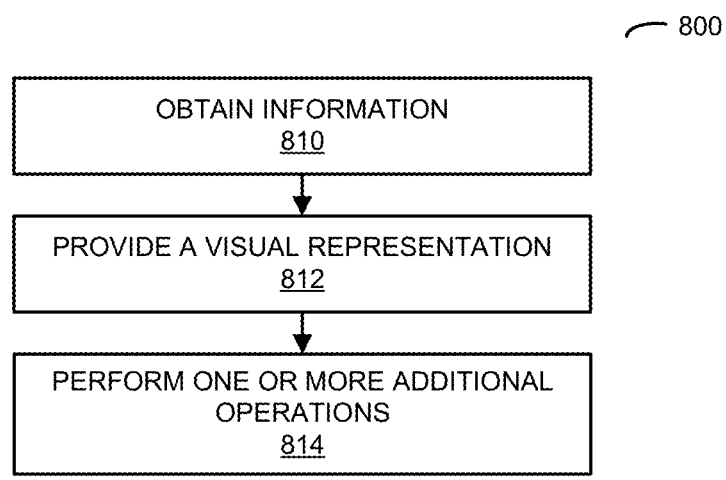
FIG. 8 is a flow diagram illustrating an example of a method for providing a visual representation of radio-frequency performance and/or one or more communication-performance metrics of a wireless network in an environment using an electronic device in FIG. 1 in accordance with an embodiment of the present disclosure.

FIG. 8 presents a flow diagram illustrating an example of a method 800 for providing a visual representation of radio-frequency performance and/or one or more communication-performance metrics of a wireless network in an environment, which may be performed by an electronic device (such as electronic device 110-1 in FIG. 1). During operation, the electronic device may obtain information (operation 810) specifying the radio-frequency performance and/or the one or more communication-performance metrics as a function of location in at least a portion of the environment. Then, the electronic device may provide the visual representation (operation 812), e.g., using augmented reality or virtual reality. In some embodiments, the electronic device optionally performs one or more additional operations (operation 814).

Figure 9:
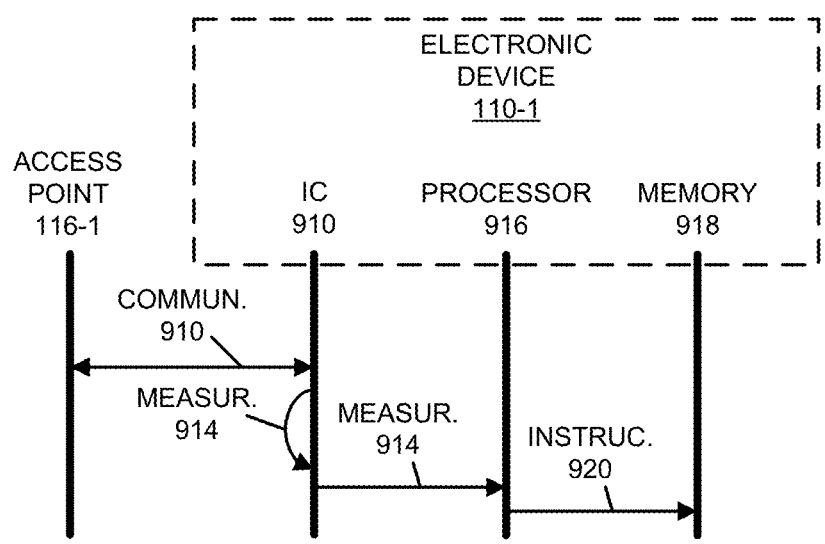
FIG. 9 is a drawing illustrating an example of communication between an electronic device and an access point in FIG. 1 in accordance with an embodiment of the present disclosure.

Embodiments of the presentation techniques are further illustrated in FIG. 9, which presents a drawing illustrating an example of communication among electronic device 110-1 and access point 116-1. Notably, interface circuit 910 in electronic device 110-1 may perform measurements 914, such as of received wireless signal strength and/or one or more communication-performance metrics (such as throughput during communication 912 with access point 116-1). More generally, the measurements 914 may specify radio-frequency performance and/or the one or more communication-performance metrics as a function of location (e.g., of electronic device 110-1) in at least a portion of an environment that includes electronic device 110-1.

Then, interface circuit 910 may provide the measurements 914 to processor 916 in electronic device 110-1. Next, processor 916 may instruct 918 a display 920 in electronic device 110-1 to display a visual representation of the radio-frequency performance and/or the one or more communication-performance metrics as a function of location in at least the portion of the environment.

Figure 10:
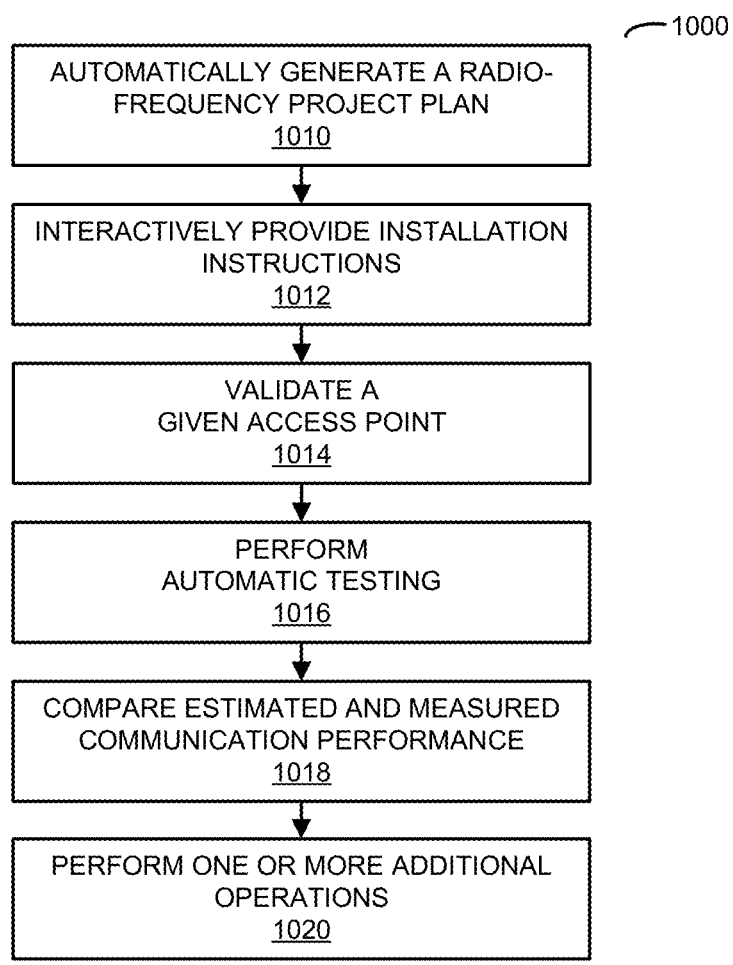
FIG. 10 is a flow diagram illustrating an example of a method for providing installation instructions using an electronic design in FIG. 1 in accordance with an embodiment of the present disclosure.

FIG. 10 is a flow diagram illustrating an example of a method 1000 for providing installation instructions, which may be performed by an electronic device (such as electronic device 110-1 in FIG. 1). During operation, the electronic device may automatically generate a radio-frequency project plan (operation 1010) for a network in an environment using a radio-frequency model and a model corresponding to at least a portion of the environment, where the radio-frequency project plan includes a number of access points, types of the access points and locations of the access points in the environment, and where the model specifies a 2D or a 3D geometric layout of the environment and/or estimated parameters associated with radio-frequency properties of at least the portion of the environment. Then, based at least in part on the radio-frequency project plan, the electronic device may interactively provide the installation instructions (operation 1012) to an installer while a given access point in the access points is being installed in the environment, where providing the instructions includes providing a digital representation of at least a portion of the environment proximate to a given location in the locations of the given access point. Moreover, after the given access point is installed, the electronic device may validate the given access point (operation 1014), where the validating includes validating the given location and an orientation of the given access point. Next, the electronic device may perform automatic testing (operation 1016) of the given access point, where the automatic testing includes testing communication performance of the given access point. Furthermore, the electronic device may provide a comparison of estimated communication performance (operation 1018) of the given access point in the radio-frequency project plan and measured communication performance (operation 1018) of the given access point, where providing the comparison includes providing a visual representation of the comparison, and the estimated communication performance is based at least in part on the radio-frequency project plan.

In some embodiments, the electronic device optionally performs one or more additional operations (operation 1020). For example, the electronic device may dynamically update and provide a visual representation of estimated communication performance based at least in part on one or more proposed changes to the given location and/or the network. Notably, the changes may include receiving user-interface instructions that indicate a change to the given location in the digital representation (e.g., a user dragging and moving the given location in the digital representation). Alternatively or additionally, the one or more proposed changes may include receiving an instruction to switch from wired backhaul to wireless backhaul, e.g., using a mesh network. Note that the estimated communication performance may be computed in real time based at least in part on the one or more proposed changes to the given location and/or the network.

Moreover, performing the automatic testing may include dynamically generating test scripts for the testing. Alternatively or additionally, performing the automatic testing may include selecting a test script from sets of predefined test scripts. Note that the test script may be dynamically generated or selected based at least in part on design goals for the network, a type of application to be used with the network, a deviation from the radio-frequency project plan and/or a deviation from the estimated communication performance.

Furthermore, the estimated communication performance may be guaranteed based at least in part on the radio-frequency project plan.

Additionally, the electronic device may dynamically update the model based at least in part on the comparison.

In some embodiments of methods 200 (FIG. 2), 300 (FIG. 3), 600 (FIG. 6), 800 (FIG. 8) and/or 1000, there may be additional or fewer operations. Furthermore, the order of the operations may be changed, and/or two or more operations may be combined into a single operation.

Figure 11:
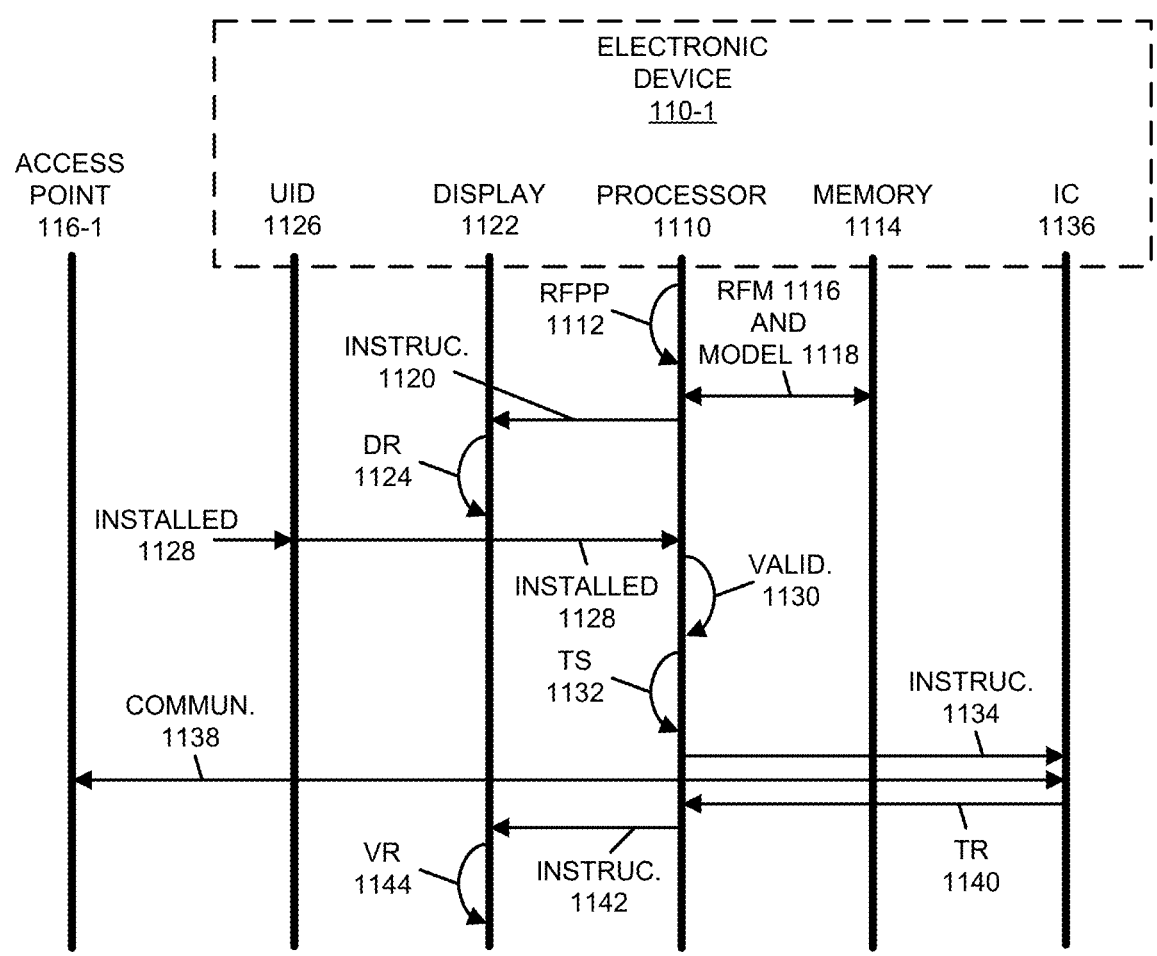
FIG. 11 is a drawing illustrating an example of communication between an electronic device and an electronic design in FIG. 1 in accordance with an embodiment of the present disclosure.

Embodiments of the presentation techniques are further illustrated in FIG. 11, which presents a drawing illustrating an example of communication among electronic device 110-1 and access point 116-1. Notably, processor 1110 in electronic device 110-1 may automatically generate a radio-frequency project plan (RFPP) 1112 for a network in an environment using a radio-frequency model (RFM) 1116 and a model 1118 corresponding to at least a portion of the environment, which are accessed by processor 1110 in memory 1114 in electronic device 110-1.

Then, based at least in part on radio-frequency project plan 1112, processor 1110 may interactively provide installation instructions to an installer while access point 116-1 in the access points is being installed in the environment. For example, processor 1110 may provide instruction 1120 to display 1122 in electronic device for a digital representation (DR) 1124 of at least a portion of the environment proximate to a given location in the locations of access point 116-1. As the installation process progresses (e.g., when the installer is ready to install a subsequent second access point in the access points), processor 1110 may dynamically update the digital representation to indicate a second location in the locations of the second access point.

Moreover, when the installer indicates that access point 116-1 is installed 1128 (e.g., via a user-interface device or UID 1126, such as: a keyboard, a mouse, a stylus, a touchpad, a touch-sensitive display, a voice recognition engine, etc.), processor 1110 may validate 1130 access point 116-1. Next, processor 1110 may perform automatic testing of access point 116-1. For example, processor 1110 may dynamically generate a test script (TS) 1132 (which specifies one or more tests to be performed) based at least in part on radio-frequency project plan 1112, and may instruct 1134 an interface circuit (IC) 1136 to perform test script 1132. While performing test script 1132, interface circuit 1136 may communicate 1138 with access point 116-1.

During or after the testing is completed, interface circuit 1136 may provide test results (TR) 1140 to processor 1110. Additionally, processor 1110 may instruct 1142 display 1122 to present a visual representation (VR) 1144 of a comparison of estimated communication performance of access point 116-1 in radio-frequency project plan 1112 and measured communication performance of access point 116-1.

While FIGS. 4, 7, 9 and/or 11 illustrate communication between components using unidirectional or bidirectional communication with lines having single arrows or double arrows, in general the communication in a given operation in this figure may involve unidirectional or bidirectional communication. Moreover, while FIGS. 4, 7, 9 and/or 11 illustrate operations being performed sequentially or at different times, in other embodiments at least some of these operations may, at least in part, be performed concurrently or in parallel.

We now further describe the disclosed techniques. In the first group of embodiments, an electronic device that performs at least some of the operations in the wireless-network design techniques is described. This electronic device includes: an image sensor, an interface circuit, a processor, and memory storing program instructions (such as an application that executes in an environment of the electronic device, e.g., an operating system or a browser). When executed by the processor, the program instructions cause the electronic device to collect information that is used to create a digital twin or representation of an environment that includes the electronic device. Notably, during operation, the electronic device may instruct a user of the electronic device to move through the environment. For example, the electronic device may display the instructions to the user in a user interface, such as to point the image sensor in different directions in the environment.

Then, while the user (and, thus, the electronic device) is moved, the electronic device may acquire measurements (such as radio-frequency measurements using the interface circuit) and/or images of the environment (e.g., using a CMOS image sensor, a CCD image sensor, a LiDAR image sensor, etc.). Moreover, the electronic device may determine its location(s) and/or orientation(s) while the measurements and/or images are acquired. For example, the electronic device may determine the location using: the strength of wireless signals from known locations (such as base stations in a cellular-telephone network and/or access points in a wireless local area network); a local positioning system (e.g., via triangulation and/or trilateration); and/or a Global Positioning System. Furthermore, the electronic device may determine the orientation using an accelerometer in the electronic device (and, more generally, another type of orientation sensor, such as compass). Note that the content in at least some of the images may, at least part, overlap and/or the images may provide a comprehensive set of views of the environment. Alternatively, when there is missing content in the environment, such as a particular view or perspective, the electronic device may instruct the user to position the image sensor so that one or more images of the particular view or perspective can be acquired.

Next, the electronic device may provide, addressed to a computer system, information specifying the measurements, images, the location(s) of the electronic device and/or the orientation(s) of the electronic device. This computer system may be remotely located (such as a cloud-based computer system) and may include one or more computers at one or more geographic locations.

Additionally, the computer system may automatically generate or create the digital twin or representation of the environment (such as a virtual 3D model) based at least in part on the measurements, images, the location(s) and/or the orientation(s). For example, the computer system may generate the digital twin by inputting the images, the location(s) and/or the orientation(s) to a pretrained predictive model (such as a neural network, e.g., a convolutional neural network or a recurrent neural network), which outputs the digital twin. Alternatively or additionally, generating the digital twin may involve analysis of the images using an image-analysis technique, such as: an edge or a line-segment detector, a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a features from accelerated segment test (FAST) detector, a computer-vision technique and/or another image-processing or image-analysis technique.

Note that the digital twin may include or correspond to the physical layout of the environment, such as rooms, doorways, windows, architecture, etc. Consequently, the digital twin may represent a geometry of the environment, including the relationships of various elements in the physical layout to one another in order to form a complete model of an arbitrary physical space. For example, the complete model may include or may represent a complete 2D or 3D floor plan of a building or a portion of a building, which may include multiple floors and their relationships. Note that the digital twin may be optionally based at least in part on an existing 2D floor plan, such as a file that is compatible with Adobe Acrobat (from Adobe Systems, Inc. of San Jose, California), Joint Photographic Experts Group or JPEG (from the International Organization for Standardization of Geneva, Switzerland, and the International Electrotechnical Commission of Geneva, Switzerland), or a bitmap (BMP). Moreover, the digital twin may be optionally based at least in part on a video of the exterior of the building. Furthermore, the digital twin may optionally characterize communication performance of an existing wireless network in or proximate to the environment. In some embodiments, the digital twin may be suitable for use with rendering techniques that dynamically generate different views or perspectives in the environment as a location and/or an orientation changes, e.g., for use in augmented reality or virtual reality. In the context of the disclosed wireless-network design techniques, the digital twin may be used in the subsequent reliable and accurate design of a wireless network in at least a portion of the environment.

While the preceding discussion illustrates operations performed by the electronic device and the computer system, in other embodiments some or all of the operations performed by the computer system may be performed by the electronic device. Moreover, in some embodiments, the electronic device may perform at least some of the operations even when a connection to the computer system is currently unavailable. In these embodiments, the electronic device may perform the remaining operations (such as providing the one or more images to the computer system) when a connection to the computer system is subsequently available. Alternatively or additionally, when the connection to the computer system is currently unavailable, the electronic device may perform the operations that would otherwise be performed by the computer system.

In some embodiments, instead of an electronic device that is carried or moved by a user through the environment, a robot or a drone may include or may convey the electronic device through the environment, so that the measurements and/or the one or more images can be acquired (and, thus, the digital twin may be created).

In the first group of embodiments, an electronic device that performs at least some of the operations in the wireless-network design techniques is described. This electronic device includes: an image sensor, an interface circuit, a processor, and memory storing program instructions (such as an application that executes in an environment of the electronic device, e.g., an operating system or a browser). When executed by the processor, the program instructions cause the electronic device to estimate one or more parameters associated with a structure in an environment of the electronic device. These parameters may be used in a radio-frequency model of the environment, which can be used to simulate one or more radio-frequency characteristics of the environment, e.g., in a band of frequencies, such as: 900 MHz, 2.4 GHz, 5 GHz, 6 GHz, 7 GHz, 60 GHz, and/or a band of frequencies used by a Citizens Broadband Radio Service, LTE and/or 5G (and, more generally, a band of frequencies used to communicate data, e.g., in a cellular-telephone network, such as a microcell, a small cell, etc.).

Notably, during operation, the electronic device may acquire one or more images of the structure in environment (such as a portion of a room, a wall, a floor, a ceiling, etc.). Moreover, the electronic device may determine the perspective of a given image, such as a location of the electronic device and/or an orientation of the electronic device. For example, the electronic device may determine the location using: the strength of wireless signals from known locations (such as base stations in a cellular-telephone network and/or access points in a wireless local area network); a local positioning system (e.g., via triangulation and/or trilateration); and/or a Global Positioning System. Furthermore, the electronic device may determine the orientation using an accelerometer in the electronic device (and, more generally, another type of orientation sensor, such as compass).

Then, the electronic device may analyze the one or more images to identify the structure. For example, the electronic device may identify the structure by inputting the one or more images to a pretrained predictive model (such as a neural network, e.g., a convolutional neural network or a recurrent neural network), which outputs information about the structure (such as a classification or a type of the structure and/or, as described further below, one or more predicted physical properties of the structure). Alternatively or additionally, identifying the structure may involve analysis of the one or more images using an image-analysis technique, such as: an edge or a line-segment detector, a texture-based feature detector, a texture-less feature detector, a SIFT-like object-detector, a SURF detector, a binary-descriptor (such as ORB) detector, a BRISK detector, a FREAK detector, a BRIEF detector, a FAST detector, a computer-vision technique and/or another image-processing or image-analysis technique.

In some embodiments, the electronic device may estimate one or more parameters in a radio-frequency model of at least a portion of the environment (such as a wall, a room, a building, etc.) based at least in part on the identified structure. For example, information associated with the identified structure may be input to a second pretrained predictive model (such as a second neural network, e.g., a convolutional neural network or a recurrent neural network), which outputs the estimated one or more parameters. More generally, the pretrained predictive model may have been trained using a machine-learning technique, such as a supervised-learning technique. The supervised-learning technique may include: a classification and regression tree, a support vector machine (SVM), linear regression, nonlinear regression, logistic regression, least absolute shrinkage and selection operator (LASSO), ridge regression, a random forest, and/or another type of supervised-learning technique. Note that in some embodiments, the pretrained predictive model that identifies the structure may output the estimated one or more parameters.

In some embodiments, the estimated one or more parameters may include: a type of material (such as drywall, wood, brick, concrete, glass, etc.), a dielectric constant in a band of frequencies, a permittivity in the band of frequencies, a conductivity in the band of frequencies, a thickness (such as the thickness of a wall), spatial variation in the estimated one or more parameters (such as a standard deviation), average or mean values of the estimated one or more parameters, etc.

Next, the electronic device may perform radio-frequency simulations of at least a portion of the environment based at least in part on the radio-frequency model with the estimated one or more parameters. For example, the radio-frequency simulations may use radio-frequency propagation software and/or finite element software. In some embodiments, the radio-frequency simulations may use Savant software, EMIT software and/or high frequency simulation software or HFSS (from ANSYS, of Canonsburg, Pennsylvania). Note that the radio-frequency simulations may determine or calculate one or more communication-performance metrics of a planned wireless network or information associated with the one or more communication-performance metrics in at least the portion of the environment, such as: a data rate, a data rate for successful communication (which is sometimes referred to as a 'throughput'), an error rate (such as a retry or resend rate), a received signal strength, a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). Alternatively or additionally, the electronic device may determine or calculate the one or more communication-performance metrics using a third pretrained predictive model (such as a neural network, e.g., a convolutional neural network or a recurrent neural network).

While the preceding discussion illustrated the electronic device performing operations in the wireless-network design techniques, in other embodiments at least some of the aforementioned operations are performed by a computer system, such as a cloud-based computer system that includes one or more computers, and which may be at one or more geographic locations. For example, the electronic device may provide the one or more images, the location and/or the orientation to the computer system. Then, the computer system may: analyze the one or more images to identify the structure; estimate the one or more parameters in the radio-frequency model; perform the radio-frequency simulations; and/or determine or calculate the one or more communication-performance metrics. In some embodiments, the electronic device and/or the computer system may use the digital twin (or information included in the digital twin) when performing one or more of the aforementioned operations.

Moreover, in some embodiments, the electronic device and/or the computer system may use information and/or results of one or more of the aforementioned operations associated with one or more other or different environments (which may be stored in memory) when performing one or more of the aforementioned operations. For example, the information and/or results may be associated with the design of one or more wireless networks using the program instructions (which may have been executed by one or more other instances of the electronic device).

Note that the determined or calculated one or more communication-performance metrics may be used, in conjunction with information associated with or corresponding to a desired communication performance of the wireless network (such as a low, medium or high-density wireless deployment, which may be provided by a customer to the electronic device via a user interface associated with the program instructions), to design the wireless network. For example, the electronic device and/or the computer system may use the determined or calculated one or more communication-performance metrics to determine the number and locations of wireless infrastructure associated with the wireless network, such as: a type of access point (and, more generally, a communication network device), a vendor or manufacturer of the access points, a number of access points, their locations, how they are mounted (e.g., on the wall or the ceiling), antenna patterns of the access points, overlap of the coverage associated with the access points, etc. Once again, the design of the wireless infrastructure for the wireless network may be determined using a fourth pretrained predictive model (such as a neural network, e.g., a convolutional neural network or a recurrent neural network), which uses the digital twin and the determined or calculated one or more communication-performance metrics as inputs, and which outputs information specifying the wireless infrastructure. More generally, the pretrained predictive model used by the electronic device and/or the computer system to determine the wireless infrastructure may have been trained using a machine-learning technique.

In the second group of embodiments, the electronic device and/or the computer system may perform at least some of the operations in the analysis techniques in order to dynamically adapt or update one or more pretrained predictive models to design a wireless network with guaranteed communication performance. Notably, in some embodiments, the communication performance of the wireless network may be guaranteed in advance. For example, the one or more of the pretrained predictive models may be dynamically adapted based at least in part on feedback about the actual communication performance of a designed wireless network. Notably, after the designed wireless network is deployed, the wireless infrastructure (such as access points) may report results of communication-performance metrics that are measured and/or determined by, e.g., the access points and/or clients in the wireless network, to the computer system. Then, the computer system may retrain one or more of the pretrained predictive models based at least in part on differences between the reported one or more communication-performance metrics and a target or desired communication performance (such as a data rate, a throughput, loading, etc.). The one or more of the pretrained predictive models may be used by the computer system and/or may be provided to the electronic device (or, more generally, instances of the electronic device that execute program instructions that implement the wireless-network design techniques).

In some embodiments, based at least in part on the feedback, the electronic device and/or the computer system may dynamically and automatically adjust one or more parameters in order to improve one or more communication-performance metrics and, thus, to achieve or meet the target or desired communication performance.

These capabilities may allow the one or more one or more of the pretrained predictive models to converge on design solutions that, as more wireless networks are designed, are increasingly accurate, so that, eventually, the wireless-network design techniques determine the necessary wireless infrastructure correctly in a one-pass or a one-shot process (so that iterative measurements and changes are not needed). Moreover, the capabilities may allow a provider of the program instructions and/or the computer system to guarantee that the communication performance of the wireless network is within a predefined range (e.g., 5, 10 or 25%) of a target or desired communication performance. Consequently, the analysis techniques may eliminate the need for a wireless site survey and, more generally, wireless expertise on the part of a user or customer. Instead, a user may use the first group of embodiments to design the wireless network. Next, the user may order to wireless infrastructure and may deploy it with minimal or no subsequent revision.

In the third group of embodiments, an electronic device that performs at least some of the operations in the presentation techniques is described. Notably, the electronic device may provide a user interface that allows a user to visualize radio-frequency performance in an environment. For example, the electronic device may provide display a representation of received signal strength and, more generally, one or more communication-performance metrics of a wireless network. In some embodiments, the representation is presented using augmented reality or virtual reality. Moreover, in some embodiments, the representation may include an immersive graphical representation of the radio-frequency performance, such as dynamically varying 3D (e.g., sinusoidal) patterns corresponding to the received signal strength and, more generally, the one or more communication-performance metrics of the wireless network.

Note that a user of the electronic device may be able to dynamically interact with the representation. For example, the user may be able to select a virtual object corresponding to wireless infrastructure in the environment (such as an access point) and make a proposed change (such as dragging and dropping the virtual object to a different location in the environment, e.g., to a different location in a room). In response, the representation may change to illustrate a predicted impact on the radio-frequency performance. Alternatively or additionally, numerical values may be displayed in the user interface to indicate the predicted impact. These capabilities may allow the user to dynamically and interactively revise the design of a wireless network and to intuitively understand the predicted impact on the radio-frequency performance.

While the aforementioned operations may be performed by the electronic device, in other embodiments at least some of the operations are performed by the computer system. For example, the electronic device may report its current location to the computer system. In response, the computer system may generate the representation and may provide information specifying the representation to the electronic device for display.

Note that the predicted impact of a change may be determined using a pretrained predictive model, such as a neural network and/or a predictive model that is trained using a machine-learning technique. Moreover, in some embodiments, the representation is based at least in part on the digital twin.

While the preceding discussion illustrated the techniques, in other embodiments the techniques may include additional or fewer operations. Furthermore, the order of the operations may be changed, there may be different operations, two or more operations may be combined into a single operation, and/or a single operation may be divided into two or more operations.

We now describe embodiments of the wireless-network design techniques. Existing approaches for designing wireless network are typically complicated, expensive and time-consuming. For example, the existing approaches often require significant domain expertise and navigating through a crowded marketplace with multiple vendors whose products are often disjointed or incompatible with each other. Moreover, these difficulties often result in an iterative process that attempts to address numerous inefficiencies with human intervention or manual effort.

The disclosed wireless-network design techniques provide a streamlined and efficient process, with reduced complexity, cost and effort. Notably, by leveraging an application (which may be installed on and execute in the environment of a portable electronic device, such as a cellular telephone), a user may collect information by walking through an environment (such as a building) with the portable electronic device while the application executes on their portable electronic device. Note that the application may use augmented reality or virtual reality. Using this information, a computer system may create a digital twin of the environment, which may be used to design the wireless network (e.g., via radio-frequency modeling). Then, the components in the wireless network can be ordered and installed. In some embodiments, the wireless network may have a guaranteed communication performance. Thus, the wireless-network design techniques may reduce or eliminate the need for an iterative process, may reduce or eliminate the need for domain expertise, and may minimize the manual effort of a user in obtaining the desired communication performance.

In some embodiments, during the wireless-network design techniques: a user may perform initiation; a computer system may perform processing; a user may approve the design; the computer system may provide installation assistance; the computer system may provide system optimization; and/or the computer system may perform global optimization. Notably, during initiation, the user may: load an application on a portable electronic device (such as their cellular telephone); establish an account (e.g., by providing an email address, credentials, such as a username and a password, etc.); perform scans of multiple or all the rooms in an environment (such as using a LiDAR-capable cellular telephone); and submit the information. Note that during the scans, the application may guide the user through the process (e.g., "walk to the center of room, slowly rotate 360°, okay that's great we got it, walk slowly to the next room, etc."). Moreover, the application may provide feedback about progress, such as a graph or a visualization, visual prompting (e.g., a real-time rendering of a rudimentary floor map showing the progress and/or the user's path), etc.

Moreover, during the processing, the computer system may convert the scans into 2D or 3D models (such as the digital twin). Note that a pretrained model (such as a neural network) may predict or infer the materials in a room (such as in the walls, floor, and/or ceiling). Then, the computer system may automatically perform radio-frequency modeling based at least in part on the digital twin. This radio-frequency modeling may include: operating frequency bands, transmit power, antenna patterns, radio-frequency chains, channel selection and parameter optimization. In some embodiments, the wireless-network design techniques may provide a radio-frequency self-optimized network (RF SON). Moreover, the computer system may: compare simulated and desired communication performance; recommend wireless-network components (such as access-point models and placement to achieve the desired communication performance); and/or generate and provide a bill of materials and drawings illustrating placement of wireless-network components (such as access points, radio nodes, switches, routers, etc.).

Furthermore, during user approval, a user may review the proposed design (such as the access-point placements) and may provide updates for any changes. Then, the user may approve purchase of the wireless-network components. Next, the user may receive the wireless-network components.

Additionally, during installation assistance, the user or an installer may install the wireless-network components. The computer system may provide interactive real-time guidance, such as visualization of the installation location (such as via augmented reality). Moreover, the computer system may provide feedback, such as visualization of the radio-frequency coverage and/or communication performance as the user or the installer moves or adjusts the installation location(s).

In some embodiments, during system optimization, the computer system may analyze the communication performance (e.g., from end to end) of the wireless network, and may highlight or flag notable issues or limitations (such as local area network issues versus broadband communication-performance issues), and may provide recommendations for remedial action. Moreover, the computer system may generate radio-frequency traffic and may measure actual radio-frequency communication performance. Furthermore, the computer system may perform automated radio-frequency tuning (such as radio-frequency SON). Then, the computer system may compare the measured radio-frequency communication performance (such as RSSI, throughput, etc.) to the predicted radio-frequency communication performance. Next, the computer system may identify any significant differences (such as difference of at least 10, 15, 20, 25, 30 or 50%) and may optionally reoptimize the wireless-network design using radio-frequency simulations and provide recommended remedial action(s) (such as ways to improve the communication performance).

Moreover, during global optimization, the computer system may compile anonymized results from multiple wireless networks of different users. These results may be used to train (or retrain) one or more predictive models (such as a neural network) that are used in the wireless-network design techniques.

In some embodiments, the wireless-network design techniques may provide an accurate quote for a wireless-network design within a short time interval following the scans (such as 30 s).

Moreover, in some embodiments, a user may specify: a number of floors they want to cover (e.g., by selecting a building in a map associated with navigation software or a satellite image), a building architecture (e.g., from a set of predefined building types, such as wood, steel/concrete, etc.), and/or a deployment density (such as a high or a low density deployment). Alternatively or additionally, a user may upload or specify a 2D floor plan (such as a file that includes or specifies the 2D floor plan) and/or may provide information that specifies the 2D floor plan (such as one or more images or LiDAR scans of the environment, or an image of a fire diagram). Then, the computer system may design the wireless network (such as determine the number and the locations of access points) based at least in part on the user-specified or provided information.

Furthermore, in some embodiments, during one or more of the operations in the wireless-network design techniques (such as quotation, installation, commissioning, troubleshooting, de-commissioning, etc.) a user or an installer may interact with the digital twin and collaborate in optionally revising the wireless-network design. Note that the collaboration may be with a provider of the wireless-network design techniques and/or a third party. For example, the user or the installer may use a user interface (which may include a virtual-reality interface) to view a site via a virtual walk through and to provide recommendations, suggestions and/or to ask questions. Moreover, the computer system may provide guidance to the user or the installer (e.g., "The access point is on your left."), such as via an augmented-reality interface.

Additionally, during installation, the computer system may allow a user or an installer to capture communication-performance reports. For example, the application may ask whether the user or the installer is finished installing an access point. If yes, the user or the installer may activate or select a user-interface icon in a user interface associated with the application in order to test the wireless network (or a wireless-network component) and to capture a communication-performance report.

Note that, in some embodiments, the wireless-network design techniques may be used to determine a business intent of a customer. For example, the computer system may determine the problem a customer is trying to solve (sufficient connectivity, premium service, etc.) when designing and providing a quote for a wireless network. Then, the computer system may use the digital twin (or radio-frequency model) to evaluate whether the wireless-network design addressing this problem. In some embodiments, based at least in part on one or more key-performance indicators or communication-performance metrics for a wireless network (e.g., a number of connected users, a number of dropped connections because of dead spots, etc. . . . ), the computer system may provide a suggestion or a recommendation (such as an upgrade). Thus, the computer system may indicate: "We know you asked for good enough connectivity, but we see a lot of user connections dropping. Are you interest in improving this deployment?"

In some embodiments, an initial walkthrough with an electronic device is used to capture a visual record that is used to generate the digital twin. These measurements may include a record of existing radio-frequency communication performance in an environment. For example, this characterization may include: the communication performance of an existing wireless network that is going to be removed or replace ("We noticed that you have a network that generates lots of interference. Will this network be removed or replaced with the new network?") and an existing wireless network that is not going to be removed or replaced ("This network appears to be generating interference and is coming from the office/building next door.").

Moreover, the predicted communication performance of the design may include a predicted communication performance of a mesh link relative to wired links that may be coupled to one or more access points. However, in some embodiments, the initial design may not include a mesh link. Instead, during the installation process, the installer may indicate or request that the given node in the network that they are working on may need a mesh link for backhaul, e.g., because of the difficulty of providing a cabled connection to an access point. In these embodiments, the installation application may provide real time feedback to the installer that: acknowledges their request; indicates whether the request is reasonable/feasible given the current deployment plan; provides a real time indication of the expected communication performance changes to the network at this location because of the change; and requests that installer either accept the communication-performance changes or requests (where possible) one or more suggestions for further additions/changes to the network that may counteract any negative impacts to network performance because of to the addition of the mesh backhaul link for that specific access point or location. When the installer accepts the communication-performance change (and, thus, accepts use of the mesh network), the electronic device and/or the computer system may dynamically adapt or update the one or more pretrained predictive models so that future wireless-network designs incorporate the mesh network. Alternatively or additionally, the computer system may update the recommended remedial action in similar circumstances to include the use of a mesh network for backhaul.

While the preceding discussion illustrated the installer initiating consideration of a mesh network for backhaul at a particular location, in other embodiments the design alternative may be considered before the installer is on-site. For example, when the design is generated and quote is provided, it may note or indicate that cables may not be installed or may not be initially installed. Moreover, the electronic device and/or the computer system may provide information specifying the design tradeoffs.

Furthermore, during the installation process, the installation application may assist the installer by showing or indicating progress. For example, a user interface associated with the installation application may indicate the status, such as: 3 of 5 steps have been completed, or the access point can go online (such as RJ-45 not in place, mesh link for now) and there are still pending operation (such as connect cable). Note that the installation process may not be linear. Instead, there may be various workflows or alternatives that the installer can follow, and the installation application may reflect this complexity.

Additionally, the user interface may include an augmented-reality overlay that indicates: pending tasks (such as displaying a small bubble on top of a particular access point with number of tasks or operations remaining); access-point status (e.g., the user interface may change the color of a component, such as an access point, to green when the access point is operational); and/or any open alarms for a particular access point; troubleshooting buttons or icons in the user interface (such as reboot, blink access point, etc.). In some embodiments, the digital twin may be used during the installation process to guide the installer around a work site (such as indicating that the next access point to install is down the corridor and to your left, which may be displayed on an interactive map).

In some embodiments, the installer may visualize the predicted radio-frequency coverage as an overlay in a user interface (such as via augmented reality on a cellular telephone or smart glasses). This capability may allow the installer to see, in real time, changes that would occur if the location of an access point is changed. Alternatively or additionally, augmented reality may be used to show the installer the change to the radio-frequency radiation as the position of an access point is changed. For example, the installer may touch an icon of an access point in a touch-sensitive display on the electronic device and may draft the displayed current access-point location to a potential new location. As the installer does this, the user interface displayed via augmented reality may dynamically update a presented predicted the radio-frequency coverage and/or radio-frequency radiation in a 2D region (such as a room) around the new location. Thus, real-time visualization may be used during installation, as well as during initial testing of the installed access point(s) or communication device(s), to provide a dynamic, interactive, immersive, and contextually sensitive experience for the installer. Note that the presented visualizations in the user interface may present information in the manner or language that is important to a customer (as opposed to focusing on the manner or language that speaks to network engineers and operators). Consequently, the visualizations may be presented in context (such as aligned with a room or architectural structure of a building) with practical information, such as whether or not the network in a room is good enough for Metaverse applications.

Moreover, during the installation process, the electronic device may automatically perform initial test the wireless network as a new access point or communication device is installed. Then, the electronic device may present visual feedback on the radio-frequency impact (e.g., the communication performance) for a given placement of the new access point. In addition, the electronic device may store an initial record of the communication performance associated with the new access point as part of the installation process. Furthermore, in some embodiments, the electronic device may automatically tie the actual wireless network communication performance back to the original predictive model or digital twin.

Thus, when the installation of a node in a network is completed, a sequence of automated self-tests may be triggered to validate the installation and the real measured communication performance versus the predicted communication performance. These tests may include (but are not limited to): initialization testing; configuration and licensing testing; a performance test suite (including throughput, latency, jitter, packet error rate, etc.); communication between the access point or DUT and the electronic device used by the installer (such as a cellular telephone) that is executing the installation application; and/or additional testing. With the exception of the testing of the communication between the access point or DUT and the electronic device used by the installer, note that the communications between the computer system and the electronic device may occur via an overlay third-party network such as cellular-telephone network, an existing WLAN, or the network that is under construction.

For example, the initialization testing may include: validation of basic two-way communications between the cloud and the access point (or device under test or DUT); and/or validation of successful completion of an internal self-test of the access point or DUT. Moreover, configuration and licensing testing may include: confirmation of specific configuration parameters or a profile written to the access point or DUT, including an access-point firmware upgrade (as needed); and/or confirmation that valid product licensing conditions are satisfied (such as the 'access point was successfully assigned an available license'). Furthermore, the performance test suite may include: communication with neighbor access points to test some or all available radios (such as 2.4 5 and 6 GHz) and to validate functionality and that inter-access-point performance falls within predicted bounds of the predictive model or digital twin; and/or communication between the access-point or DUT main communications processor and an associated backhaul network interface (such as Ethernet or wireless if a mesh network is used) to validate communication performance, including, when possible, end-to-end communication performance (such as a speed test to an Internet server) and subnet or local-area-network-specific communication performance (such as between an access point or DUT to gateway) to help pinpoint potential bottlenecks or deficiencies. Additionally, the communication between the access point or the DUT and the electronic device used by the installer that is executing the installation application may include testing some or all available radios (such as 2.4, 5, and 6 GHz) to validate that functionality and communication performance falls within predicted bounds of the predictive model or digital twin. This testing of the communication between the access point or the DUT and the electronic device used by the installer may include: machine-generated specific verbal or visual instructions (e.g., via the user interface) for the installer to move to specific locations in a room to map the actual communication performance versus the predictive model or digital twin; and/or an indication whether or not the communication performance is within acceptable predicted limits and to prompt the installer to provide final acceptance of this portion of the installation. Note that the additional testing may include: testing voice of Internet protocol (VoIP), a video mean opinion score (MOS) or quality-of-experience score, and/or virtual reality or augmented reality readiness (e.g., a user may be instructed to move around a room with a virtual reality headset or to ensure that a user-interface quality is sufficient to ensure that the user does not get motion sickness).

The results of the testing may be automatically stored as an installation and actual communication-performance baseline per access point or DUT for future comparison and to facilitate dynamically adapting or updating of the one or more pretrained predictive models. Moreover, the installer may be prompted to capture or acquire an image of the final installation of the access point or DUT for recording purposes, including machine-learning-driven framing instructions to ensure that the image is useful for future predictive-model improvements (such as 'back up slightly to capture more of the room in the photo'). Furthermore, after the installation and testing has been completed, the electronic device and/or the computer system may then direct the installer to the next logical node to install. Alternatively, the installer may be allowed to choose from a list of logical next nodes to install on as part of the network buildout.

In some embodiments, a computer system may use a stored communication-performance baseline that is determined after the installation to monitor the network for deviations in communication performance that occur subsequently. For example, the communication performance of the network may be monitored over time and may be compared to the estimated communication performance and/or the stored communication-performance baseline. This capability may allow the computer system to provide recommendations to a user as to how the communication performance may be maintained or improved (such as when a new type of applications is used in conjunction with the network). Alternatively or additionally, a recommendation may indicate how a deviation from the estimated communication performance is masked or hidden (such as by using multi-link aggregation across bands of frequencies).

Note that the same tools (e.g., a 2D floor plan, the model or digital twin, etc.) may be used throughout the design, installation and ongoing monitoring of the network, so that a user is able to understand the performance of the network over the entire lifecycle.

Moreover, the ongoing monitoring may be used to dynamically update the model (or the digital twin) of the environment. For example, materials properties in a building may be determined based at least in part on radio-frequency propagation through objects (such as floors or walls) in the building during operation of the network.

We now further describe an example of the disclosed techniques and associated user interfaces. Notably, the disclosed techniques may be implemented using a wireless reality engine. During planning, measurements (such as video, LiDAR and radio-frequency), image and material analysis using pretrained predictive models (such as a supervised-learning model or a neural network) and radio-frequency modeling may be used to create a digital twin or model of a planned deployment. For example, during planning, a 3D floor plan may be captured using image analysis and/or LiDAR, materials metadata may be determined using image analysis and/or using a pretrained predictive model, and radio-frequency modeling may be performed (such as based at least in part on radio-frequency measurements onsite). Moreover, during deployment, visualization (such as augmented reality), instructions and initial testing may assist an installer in installing a planned network and ensuring service/quality-of-experience. Furthermore, during operation, machine-learning (such as a pretrained predictive model) may enable a SON, provide suggestions or recommendation, and provide support automation. Notably, a network may be optimized using radio-resource management/SON, network communication performance may be monitored (e.g., using synthetic traffic), aggregated and analyzed, and a network configuration may be visualized, e.g., via a network graph. These capabilities may enable: a smart quote (such as an on-demand quote and service level), a guaranteed quoted communication performance (which may be compared to actual network communication performance, no skill required (an electrician or a do-it-yourself individual can deploy a high-performance wireless network), and reduced manual operation and support.

Figure 12:
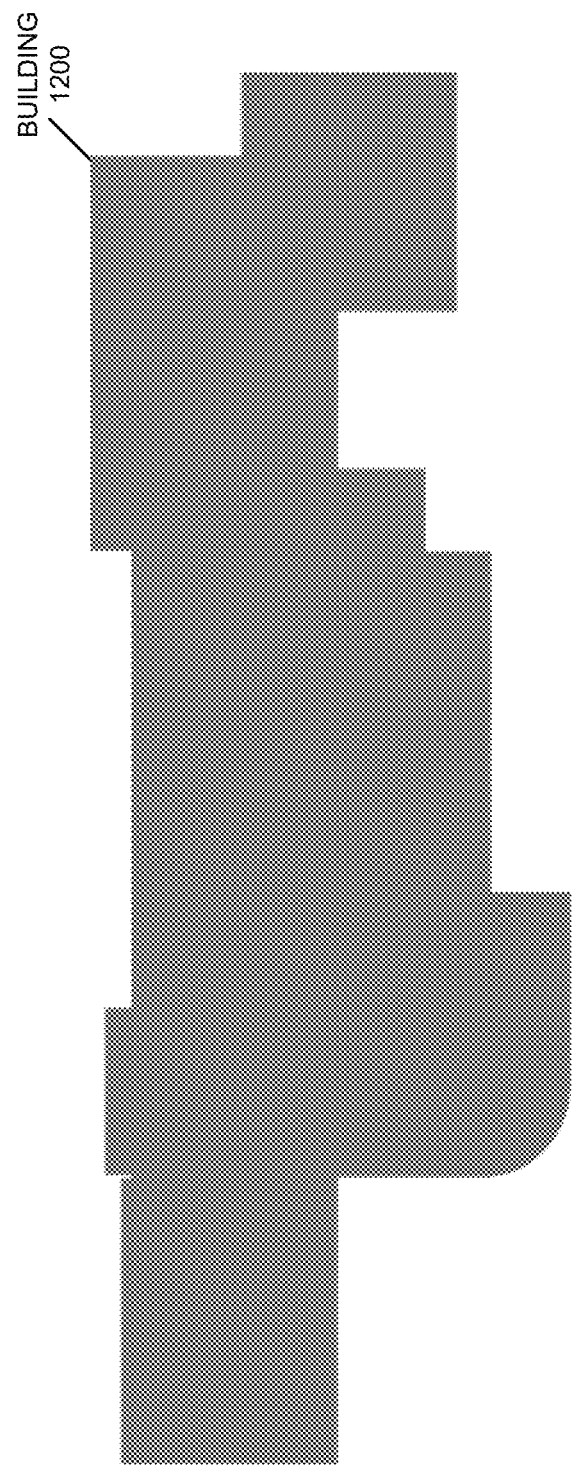
FIG. 12 is a drawing illustrating an example of a building outline in accordance with an embodiment of the present disclosure.

For example, an address look up may allow a building perimeter and square footage to be obtained. The goals may include: getting the outline of the building (in order to guide the mapping process); determining the number of floors and the building height; assessing whether or not the building has outdoor parking around the building (which may require the use or outdoor access points); and determining coordinates (such as Global Position System or latitude and longitude) for a few points of the building (which building (can be used to find relative latitude and longitude for access points). FIG. 12 presents a drawing illustrating an example of a building outline 1200 of a 25 k ft$^2$ building.

Moreover, the customer may be prompted and assisted in answer some high-level business questions. Notably, as shown in Table 1, the customer may select from different service tiers. The goal may include helping the customer or user approximate their high-level costs and comparing costs for different service options.

TABLE 1

| Service Tier | Peak/Average User Speed (MBps) | Application Support (Latency) | Price ($/mo.) |
| --- | --- | --- | --- |
| Basic Wireless | DL: 200/50 UL: 30/10 | SaaS/Web surfing, email, etc. | 500 |
| Pro Wireless | DL: 500/100 UL: 100/30 | Video conferencing/streaming | 1,000 |
| HD Wireless | DL: 1,000/300 UL: 1,000/300 | Metaverse, Immersive, Gaming | 1,500 |

Figure 13:
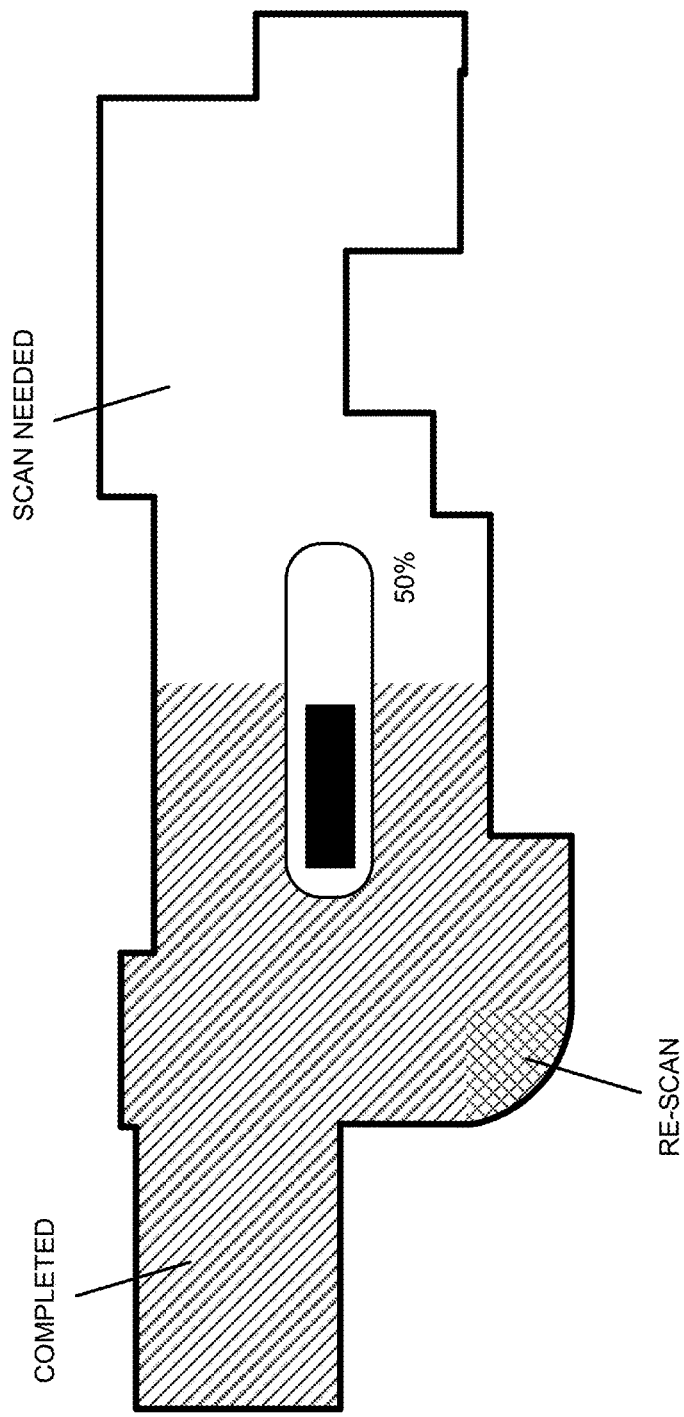
FIG. 13 is a drawing illustrating an example of mapping of a building in accordance with an embodiment of the present disclosure.

Moreover, as shown in FIG. 13, which presents a drawing illustrating an example of mapping of a building (e.g., in a user interface), the user may be guided on progress of mapping of the building. This may include regions completed, and areas where a re-scan is needed or that need to be scanned.

Figure 14:
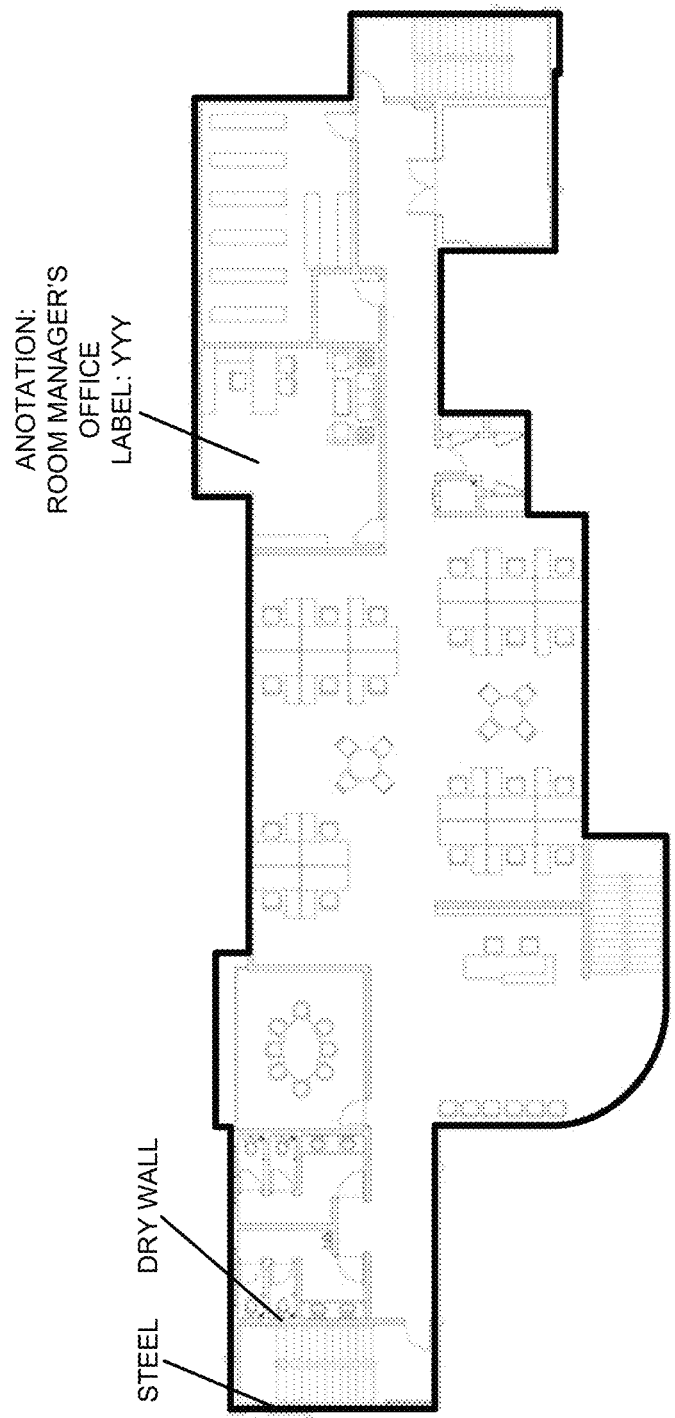
FIG. 14 is a drawing illustrating an example of auto-detection of rooms and spaces in a building in accordance with an embodiment of the present disclosure.

Then, as shown in FIG. 14, which presents a drawing illustrating an example of auto-detection of rooms and spaces in a building (e.g., in a user interface), a user may be allowed to review the cloud-based analysis to determine whether or not everything was correctly identified. In addition, the user may be allowed to add optional labels to be used to group rooms/areas in the building, which may allow the user interface to filter displayed information based at least in part on the labels.

Figure 15:
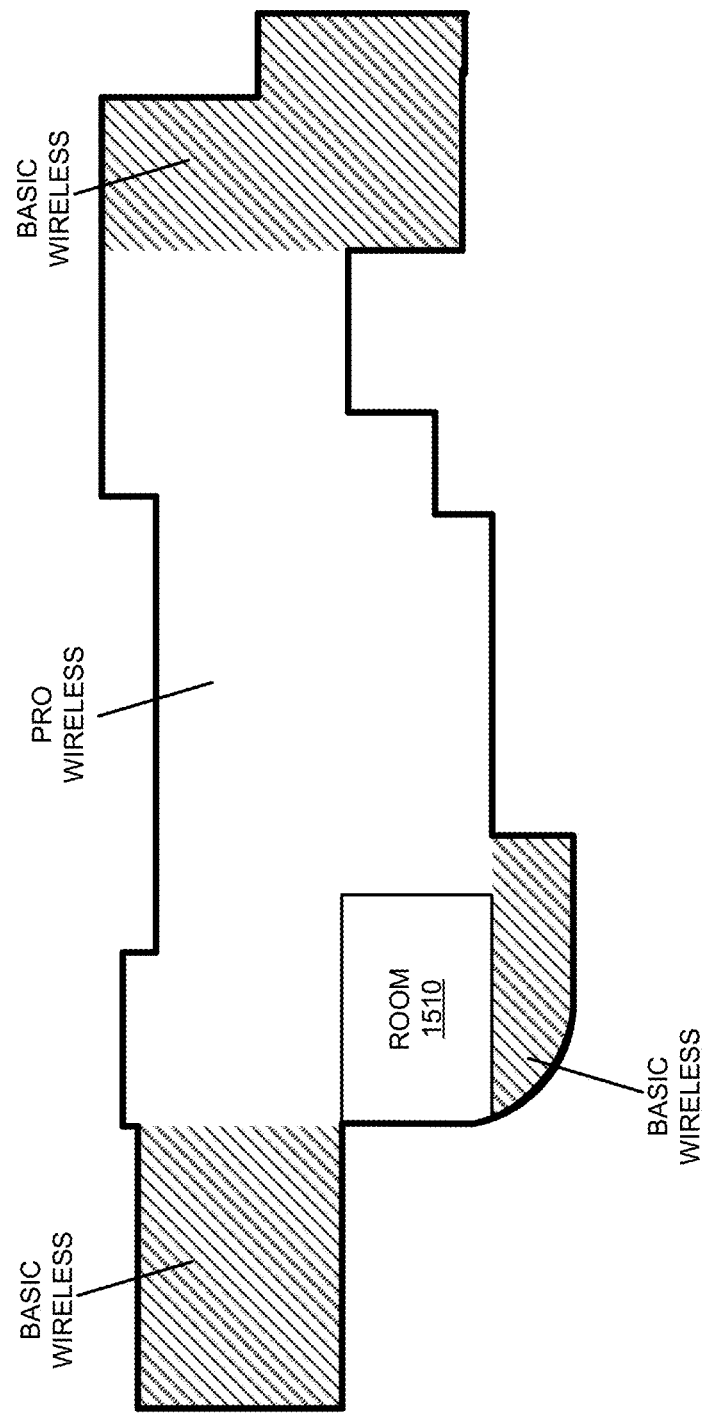
FIG. 15 is a drawing illustrating an example of regions in a building with different selected service tiers in accordance with an embodiment of the present disclosure.

Furthermore, the user may be allowed to select service tiers in different regions or areas in the building. The resulting selections are shown in FIG. 15, which presents a drawing illustrating an example of regions in a building with different selected service tiers (e.g., in a user interface). Note that room 1510 is a high-density area. The goals may include: capturing the expected network communication performance from the user perspective on room/area level (and to give an exact proposal); indicating the cost of the selected service(s); allowing the user to compare costs for different options ("What if I only use the Pro Wireless service?"); for new deployments, allowing the user to check broadband service availability; and indicating to the user where service will 'bleed' out (and, thus, where there is no service level agreement provided).

Figure 16:
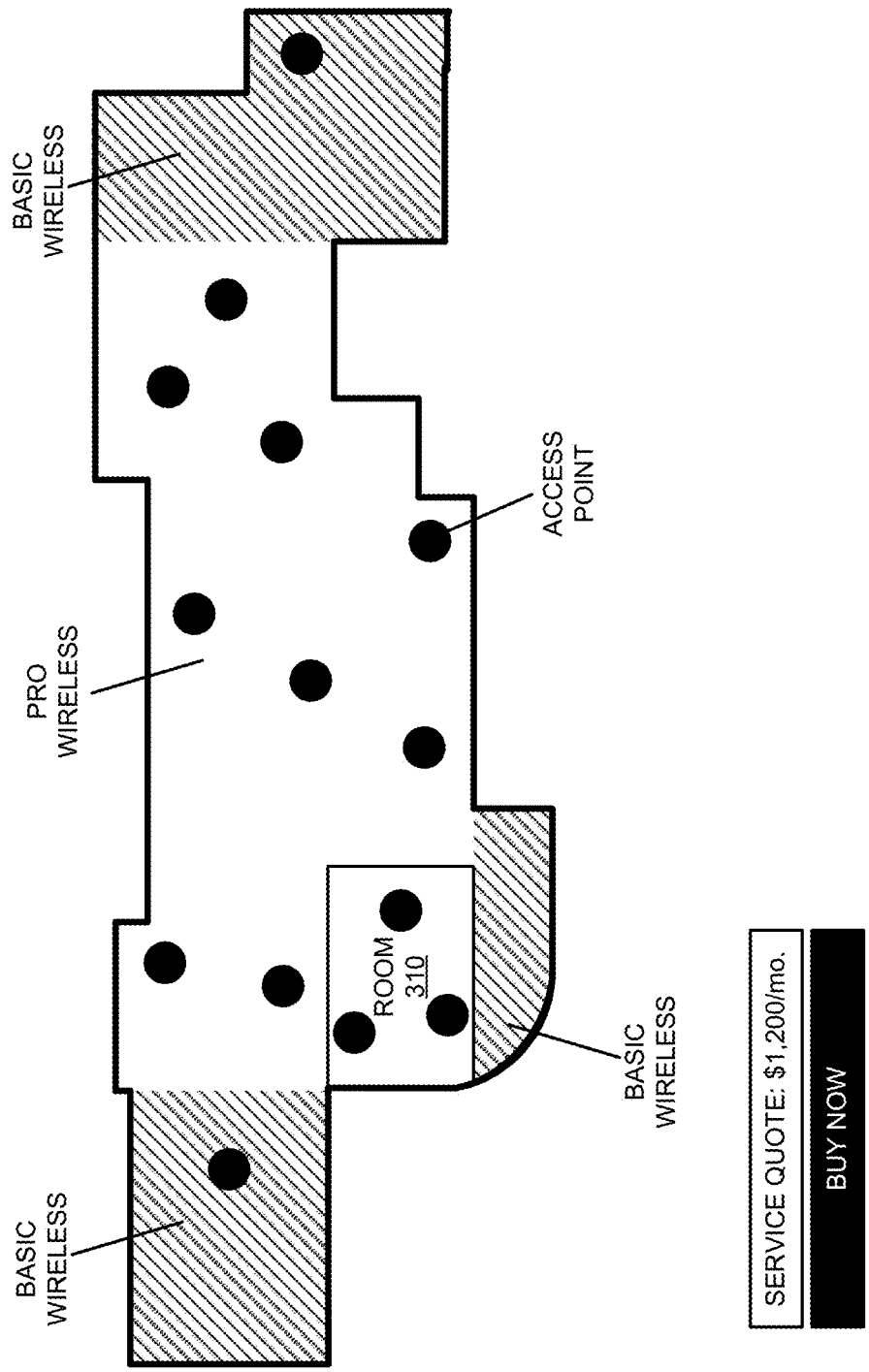
FIG. 16 is a drawing illustrating an example of a proposed design in accordance with an embodiment of the present disclosure.

Next, as shown in FIG. 16, which presents a drawing illustrating an example of a proposed design (e.g., in a user interface), the user can review access-point placement, generate a bill of materials (BOM) and place an order. The goals may include: allowing a user to review a suggested BOM/deployment plan; allowing users to note if they have a cable drop in a suggested location; allowing users to see what happens if they move access points around or change (e.g., increase or decrease) a number of access points; when a mesh network is used, assessing the impact on the deployment (such as the quality-of-experience and service cost); and showing cable runs and switches/ports (which may be added to the BOM or for which the user may need to supply their own equipment). Note that the user may obtain or see more information about a given access point in the proposed design by touching the given access point in the proposed design in a user interface on a touch-sensitive display that displays the user interface.

Figure 17:
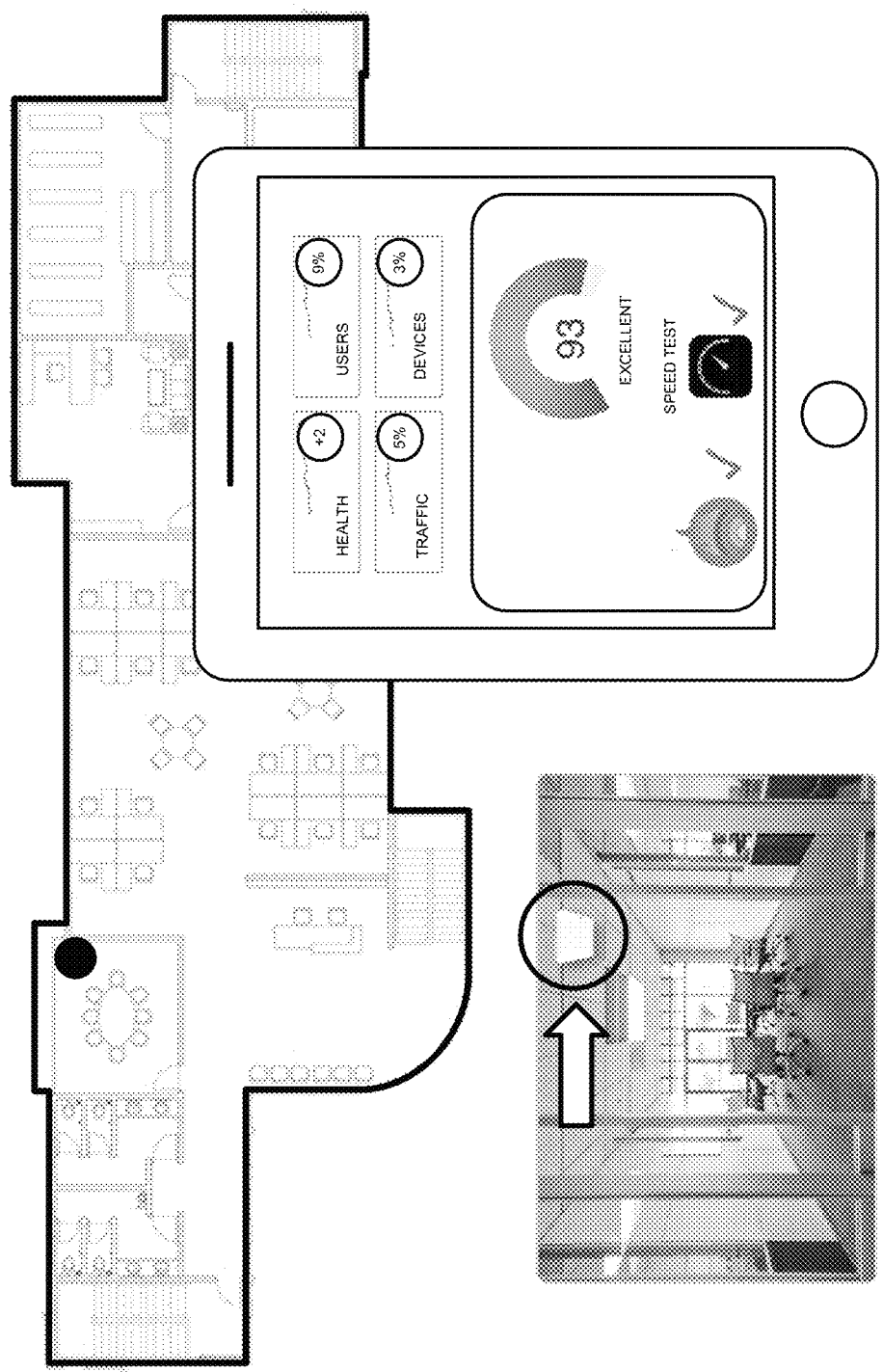
FIG. 17 is a drawing illustrating an example, of a user interface with installation information during an installation process in accordance with an embodiment of the present disclosure.

Additionally, during installation, augmented reality may be used to guide an installer. This is shown in FIG. 17, which presents a drawing illustrating an example of a user interface with installation information during an installation process (such as on day 1). The goals may include: helping the user deploy access points per the plan; validating the quality-of-experience after an access point is installed; and capturing an image of the physical installation, which may be used to update the digital twin and to verify an access-point orientation.

Figure 18:
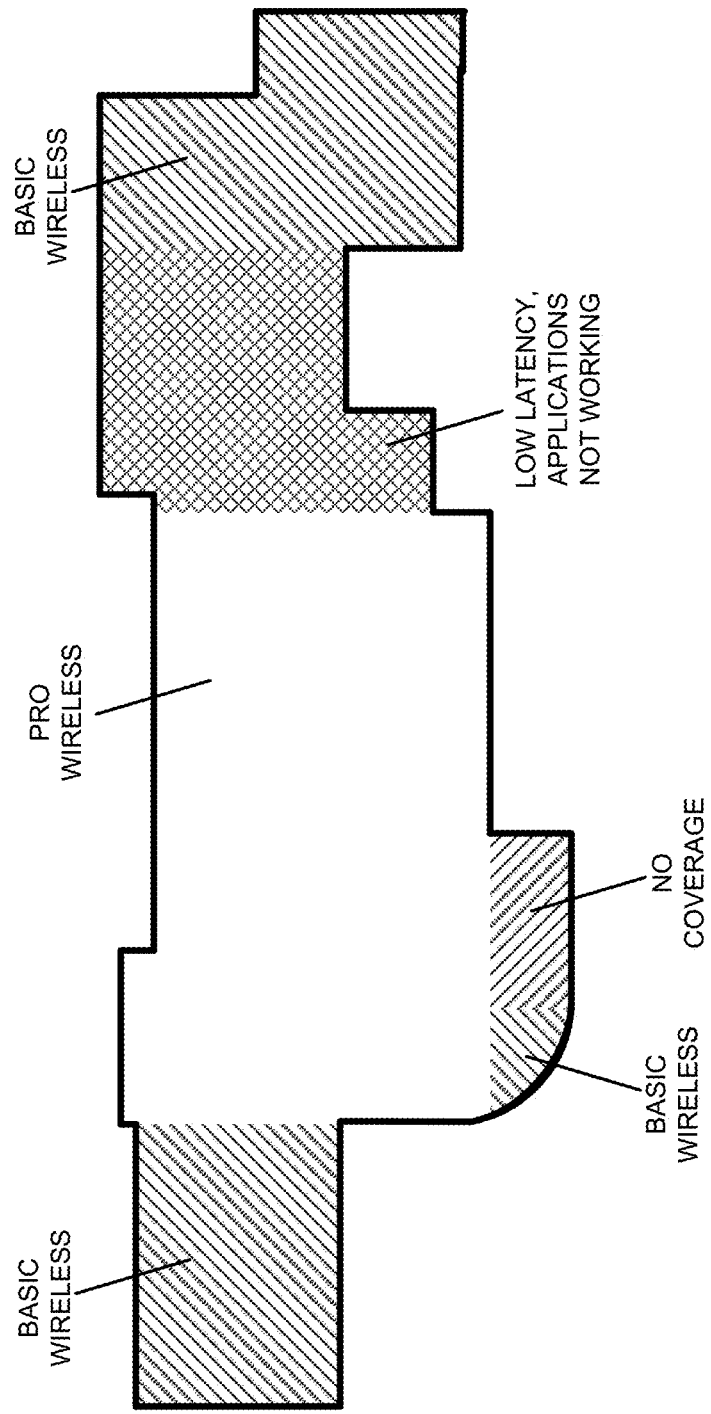
FIG. 18 is a drawing illustrating an example of a visualization of guaranteed service vs. actual service in accordance with an embodiment of the present disclosure.

FIG. 18 presents a drawing illustrating an example of a visualization of guaranteed service vs. actual service (e.g., in a user interface), which may be shown on day 2 of the installation process. The goals may include: showing a user the expected network quality-of-experience and any delta(s) with actual network quality-of-experience; and/or providing recommendations for possible fixes, such as different options. For example, if an access point does not work, a user could click on or activate an icon to have another access point shipped to them.

Figure 19:
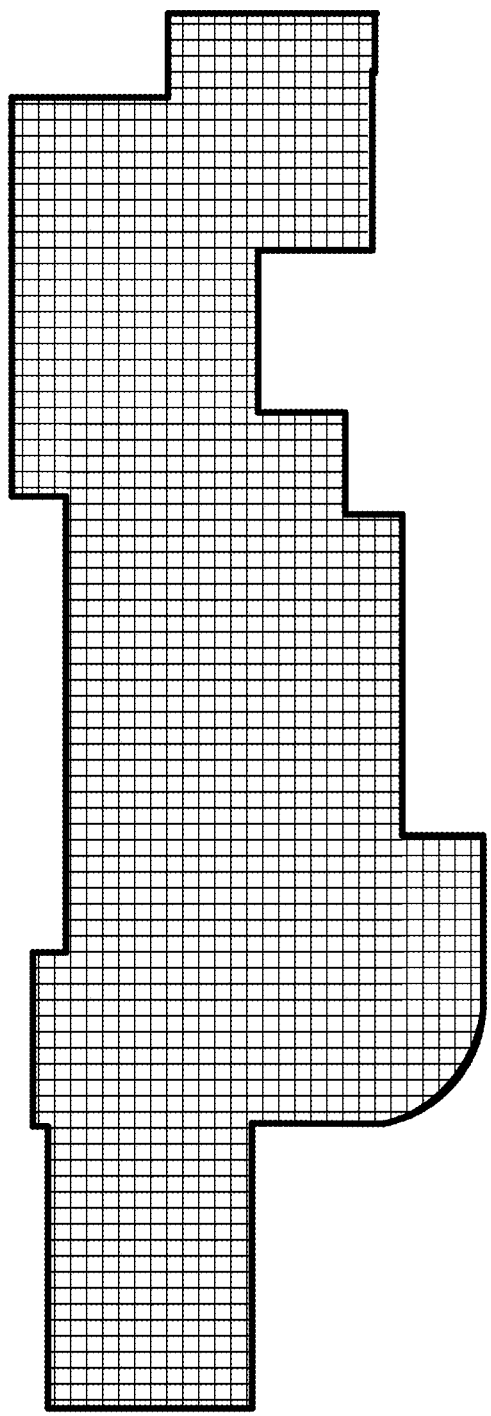
FIG. 19 is a drawing illustrating an example of a digital twin (or data model) in accordance with an embodiment of the present disclosure.

Moreover, FIG. 19 presents a drawing illustrating an example of a digital twin or data model (e.g., in a user interface). Notably, the digital twin may divide a region in cubic data layers having content, such as: empty (air), desk, cabinet, wall, etc. As discussed previously, the digital twin may be generated using: a 3D floor plan (or generated vector space) captured using image analysis and/or LiDAR, materials metadata (such as construction materials) determined using image analysis and/or using a pretrained predictive model, and radio-frequency modeling (such as based at least in part on radio-frequency measurements onsite of pre-installed or legacy networks). In addition, the digital twin may be used to determine radio-frequency SON values and predicted quality-of-experience values, and may be dynamically adapted based at least in part on post-installation testing results and/or actual network communication performance over time.

While not shown, there may also be user interfaces for: support case (such as a system-generated case or end-user generated case), which may present captured data and ticket information (such as the digital twin, SON information, communication-performance metrics, logs, etc.); system maintenance (e.g., instructions to complete tasks, such as connect a cable or move an access point); and/or a system upgrade. For example, a system upgrade may include: a recommended upgrade ("Based on network analytics, if you pay $300 you won't have these issues anymore"); replacement instructions ("It's time to replace the following 10 access points to support WiFi 7"); and/or allowing the user to explore or see 'what-if' scenarios' using the digital twin.

Note that in contrast with legacy radio-frequency planning, the disclosed techniques may offer a superior process from design, to installation, to operations. Notably, in a legacy approach, the workflow is a bottom view of how radio-frequency wireless signals propagate. Typically, a trial-and-error approach is used by a radio-frequency expert as they move access points around in an attempt to improve communication performance based on low-level communication-performance metrics (such as RSSI, SNR, etc.) that are often disconnected from business goals. In contrast, the disclosed techniques use a top-down approach centered on a desired service tier for a particular floor, area or room. The process is based on outcomes, such as the type of application(s) that will be run, the places where people gather that get crowded, etc. Moreover, the disclosed techniques are intended for use by a customer of average wireless skill or expertise by abstracting radio-frequency information into service tiers in floors, areas or rooms that people can relate to.

We now illustrate an application centric design from day 0 to day 1. During the day-0 design and specification stage, the user may specify the day-0 design goals, including: device types (e.g., Do you have old 2.4 GHz only devices you need to support?); and user and application density examples (associated with specific areas, rooms, square footage, etc.) For example, low-density/high-density business applications (such as email, remote file access, etc.) in: a spare hotel lobby (such as with one user per 200 ft² or 25 users in a 5 k ft² room); or a hotel ballroom business conference with one user per 25 ft² or 400 users in a 10 k ft² room. Alternatively, low-density/high-density video streaming (online video, instructional applications, video conferencing) in: offices with one user per 200 ft² or 30 users in multiple rooms with 6000 ft²; or a classroom/training facility with one user per 30 ft² or 30 users in a 900 ft² room. In some embodiments, there may be low-density/high-density interactive augmented reality, mixed reality or virtual reality (such as augmented-reality shopping, entertainment, etc.) in: a retail store with one user per 500 ft² or 20 users in a 10 k ft² room; or a theme-park attraction with one user per 50 ft² or 50 users in a 2500 ft² room.

Then, day-0 design parameters may be determined using a building plan and a radio-frequency model (such as a digital twin). Note that the design may be adjusted based at least in part on user application(s) and a density specification. For example, the design parameters may include the hardware technology and physical network design, such as: a MIMO order (2×2, 4×4, 8×8, etc.); simultaneous band support (2.4, 5, and/or 6 GHz); Wi-Fi version (Wi-Fi 6, Wi-Fi 6e, Wi-Fi 7, etc.); a density of deployed access-point hardware (e.g., an access point per X ft²); wired interface speeds (1, 2.5G, 5 Gb, etc.); cabling requirements (a type of cable: Cat 5e, Cat 6, mesh network, a physical location of cable drop, including the outlet and patch panel, to match an access-point placement, etc.); and/or legacy wired interface requirements.

Moreover, day-1 system parameter testing and optimization may include: testing and measurement (such as: bandwidth; latency; jitter; radio-frequency interference; mobility handoffs; signal strength and coverage uniformity; association delay; and/or a wide area network link bandwidth, latency and jitter); and system optimizations and adjustments (such as: application classification, prioritization, queuing and buffering; airtime fairness, e.g., legacy devices vs. modern devices, near vs. far, etc.; channel selection/channel plan, including spectral reuse; power-level optimization; client band steering; basic service set coloring; broadcast traffic filtering; dynamic traffic scheduling; and/or multi-link operation).

For example, in low-density business applications (such as a hotel lobby), the system parameter optimization may include: an application classification, prioritization, queuing and buffering of best-effort priority and medium buffer; an airtime fairness (e.g., legacy devices vs. modern devices, near vs. far, etc.) of maximum coverage; a channel selection of 5 GHz and 40 MHz; a power-level optimization of maximum power; client band steering of 2.4 to 5 GHz; basic service set coloring enabled; no broadcast traffic filtering; no dynamic traffic scheduling; and no multi-link operation.

Alternatively, in high-density video streaming (such as in a classroom), the system parameter optimization may include: an application classification, prioritization, queuing and buffering of high priority and maximum buffer; an airtime fairness (e.g., legacy devices vs. modern devices, near vs. far, etc.) of minimum coverage; a channel selection of 5/6 GHz and 80 MHz; a power-level optimization of low power; client band steering of 5 GHz; basic service set coloring enabled; broadcast traffic filtering of medium; dynamic traffic scheduling enabled; and no multi-link operation.

Moreover, in high-density interactive virtual reality (such as in a theme park), the system parameter optimization may include: an application classification, prioritization, queuing and buffering of maximum priority and minimum buffer; an airtime fairness (e.g., legacy devices vs. modern devices, near vs. far, etc.) of minimum coverage; a channel selection of 5/6 GHz and 160 MHz; a power-level optimization of high power; client band steering of an even load balance; basic service set coloring disabled; broadcast traffic filtering of maximum; dynamic traffic scheduling enabled; and multi-link operation enabled.

Note that layer-three settings may include: a user-equipment rate limit and a user-equipment session and idle timeout. Furthermore, while not application-specific, as part of the design automation: channels to avoid may be determined based at least in part on the initial radio-frequency scan; and, for 6 GHz, automatic frequency control (AFC) input may be used in the planning phase.

We now describe embodiments of an electronic device, which may perform at least some of the operations in the disclosed techniques. FIG. 20 presents a block diagram illustrating an example of an electronic device 2000 in accordance with some embodiments, such as one of: base station 108, one of electronic devices 110, controller 112, one of access points 116, one of radio nodes 118, computer network device 128, computer system 130 or one of computers 132. This electronic device includes processing subsystem 2010, memory subsystem 2012, and networking subsystem 2014. Processing subsystem 2010 includes one or more devices configured to perform computational operations. For example, processing subsystem 2010 can include one or more microprocessors, ASICs, microcontrollers, programmable-logic devices, one or more graphics process units (GPUs) and/or one or more digital signal processors (DSPs). In some embodiments, one or more components in processing subsystem 2010 is referred to as a 'computation device.'

Memory subsystem 2012 includes one or more devices for storing data and/or instructions for processing subsystem 2010 and networking subsystem 2014. For example, memory subsystem 2012 can include dynamic random access memory (DRAM), static random access memory (SRAM), and/or other types of memory. In some embodiments, instructions for processing subsystem 2010 in memory subsystem 2012 include: one or more program modules or sets of instructions (such as program instructions 2022 or operating system 2024), which may be executed by processing subsystem 2010. Note that the one or more computer programs may constitute a computer-program mechanism. Moreover, instructions in the various modules in memory subsystem 2012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2010.

In addition, memory subsystem 2012 can include mechanisms for controlling access to the memory. In some embodiments, memory subsystem 2012 includes a memory hierarchy that comprises one or more caches coupled to a memory in electronic device 2000. In some of these embodiments, one or more of the caches is located in processing subsystem 2010.

In some embodiments, memory subsystem 2012 is coupled to one or more high-capacity mass-storage devices (not shown). For example, memory subsystem 2012 can be coupled to a magnetic or optical drive, a solid-state drive, or another type of mass-storage device. In these embodiments, memory subsystem 2012 can be used by electronic device 2000 as fast-access storage for often-used data, while the mass-storage device is used to store less frequently used data.

Networking subsystem 2014 includes one or more devices configured to couple to and communicate on a wired and/or wireless network (i.e., to perform network operations), including: control logic 2016, an interface circuit 2018 and one or more antennas 2020 (or antenna elements) and/or input/output (I/O) port 2030. (While FIG. 20 includes one or more antennas 2020, in some embodiments electronic device 2000 includes one or more nodes, such as nodes 2008, e.g., a network node that can be coupled or connected to a network or link, or an antenna node or a pad that can be coupled to the one or more antennas 2020. Thus, electronic device 2000 may or may not include the one or more antennas 2020.) For example, networking subsystem 2014 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Networking subsystem 2014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 2000 may use the mechanisms in networking subsystem 2014 for performing simple wireless communication between the electronic devices, e.g., transmitting advertising or beacon frames and/or scanning for advertising frames transmitted by other electronic devices.

Within electronic device 2000, processing subsystem 2010, memory subsystem 2012, and networking subsystem 2014 are coupled together using bus 2028. Bus 2028 may include an electrical, optical, and/or electro-optical connection that the subsystems can use to communicate commands and data among one another. Although only one bus 2028 is shown for clarity, different embodiments can include a different number or configuration of electrical, optical, and/or electro-optical connections among the subsystems.

In some embodiments, electronic device 2000 includes a display subsystem 2026 for displaying information on a display, which may include a display driver and the display, such as a liquid-crystal display, a multi-touch touchscreen, etc.

Electronic device 2000 can be (or can be included in) any electronic device with at least one network interface. For example, electronic device 2000 can be (or can be included in): a radio, a transponder, a transceiver, a type of aircraft, a computer, a computer system, a desktop computer, a laptop computer, a subnotebook/netbook, a tablet computer, a smartphone, a cellular telephone, a smartwatch, a consumer-electronic device, a portable computing device, a display, a heads-up display, a headset, an augmented-reality or a virtual-reality headset, smart glasses, communication equipment, a computer network device, test equipment, and/or another electronic device.

Although specific components are used to describe electronic device 2000, in alternative embodiments, different components and/or subsystems may be present in electronic device 2000. For example, electronic device 2000 may include one or more additional processing subsystems, memory subsystems, networking subsystems, display subsystems and/or another subsystem (such as a sensor subsystem with one or more sensors). Additionally, one or more of the subsystems may not be present in electronic device 2000. Moreover, in some embodiments, electronic device 2000 may include one or more additional subsystems that are not shown in FIG. 20, such as a user-interface subsystem 2032. Also, although separate subsystems are shown in FIG. 20, in some embodiments some or all of a given subsystem or component can be integrated into one or more of the other subsystems or component(s) in electronic device 2000. For example, in some embodiments program instructions 2022 are included in operating system 2024 and/or control logic 2016 is included in interface circuit 2018.

Moreover, the circuits and components in electronic device 2000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 2014 (or, more generally, of electronic device 2000). The integrated circuit may include hardware and/or software mechanisms that are used for transmitting wireless signals from electronic device 2000 and receiving signals at electronic device 2000 from other electronic devices. Aside from the mechanisms herein described, radios are generally known in the art and hence are not described in detail. In general, networking subsystem 2014 and/or the integrated circuit can include any number of radios. Note that the radios in multiple-radio embodiments function in a similar way to the described single-radio embodiments.

In some embodiments, networking subsystem 2014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used particular communication protocols as an illustrative example, in other embodiments a wide variety of communication protocols and, more generally, wired and/or wireless communication techniques may be used. Thus, the disclosed techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the disclosed techniques may be implemented using program instructions 2022, operating system 2024 (such as a driver for interface circuit 2018) or in firmware in interface circuit 2018. Alternatively or additionally, at least some of the operations in the disclosed techniques may be implemented in a physical layer, such as hardware in interface circuit 2018.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit;
a display;
a computation device coupled to the interface circuit and the display; and
memory, coupled to the computation device, that stores program instructions, wherein, when executed by the computation device, the program instructions cause the electronic device to perform operations comprising:
automatically generating a radio-frequency project plan for a network in an environment using a radio-frequency model and a model corresponding to at least a portion of the environment, wherein the radio-frequency project plan comprises a number of access points, types of the access points and locations of the access points in the environment, and wherein the model specifies a two-dimensional (2D) or three-dimensional (3D) geometric layout of the environment and/or estimated parameters associated with radio-frequency properties of at least the portion of the environment;
based at least in part on the radio-frequency project plan, interactively providing installation instructions to an installer while a given access point in the access points is being installed in the environment, wherein providing the instructions comprises providing a digital representation of at least a portion of the environment proximate to a given location in the locations of the given access point;
after the given access point is installed, validating the given access point, wherein the validating comprises validating the given location and an orientation of the given access point;
performing automatic testing of the given access point, wherein the automatic testing comprises testing communication performance of the given access point; and
providing a comparison of estimated communication performance of the given access point in the radio-frequency project plan and measured communication performance of the given access point, wherein providing the comparison comprises providing a visual representation of the comparison, and the estimated communication performance is based at least in part on the radio-frequency project plan.

2. The electronic device of claim 1, wherein the operations comprise dynamically updating and providing a visual representation of estimated communication performance based at least in part on one or more proposed changes to the given location and/or the network.

3. The electronic device of claim 2, wherein the changes comprise receiving user-interface instructions that indicate a change to the given location in the digital representation.

4. The electronic device of claim 2, wherein the changes comprise receiving an instruction to switch from wired backhaul to wireless backhaul.

5. The electronic device of claim 4, wherein the wireless backhaul comprises a mesh network.

6. The electronic device of claim 2, wherein the estimated communication performance is computed in real time based at least in part on the one or more proposed changes to the given location and/or the network.

7. The electronic device of claim 1, wherein automatically generating the radio-frequency project plan comprises receiving at least a portion of the radio-frequency project plan associated with a computer system.

8. The electronic device of claim 1, wherein the operations comprise receiving the estimated communication performance associated with a computer system.

9. The electronic device of claim 1, wherein performing the automatic testing comprises dynamically generating test scripts for the testing or selecting a test script from sets of predefined test scripts.

10. The electronic device of claim 9, wherein the test script is dynamically generated or selected based at least in part on design goals for the network, a type of application to be used with the network, a deviation from the radio-frequency project plan, or a deviation from the estimated communication performance.

11. The electronic device of claim 1, wherein the estimated communication performance is guaranteed based at least in part on the radio-frequency project plan.

12. The electronic device of claim 1, wherein the operations comprise dynamically updating the model based at least in part on the comparison.

13. The electronic device of claim 12, wherein dynamically updating the model comprises receiving an updated model associated with a computer system.

14. A non-transitory computer-readable storage medium for use in conjunction with an electronic device, the computer-readable storage medium storing program instructions, wherein, when executed by the electronic device, cause the electronic device to perform operations comprising:

automatically generating a radio-frequency project plan for a network in an environment using a radio-frequency model and a model corresponding to at least a portion of the environment, wherein the radio-frequency project plan comprises a number of access points, types of the access points and locations of the access points in the environment, and wherein the model specifies a two-dimensional (2D) or three-dimensional (3D) geometric layout of the environment and/or estimated parameters associated with radio-frequency properties of at least the portion of the environment;

based at least in part on the radio-frequency project plan, interactively providing installation instructions to an installer while a given access point in the access points is being installed in the environment, wherein providing the instructions comprises providing a digital representation of at least a portion of the environment proximate to a given location in the locations of the given access point;

after the given access point is installed, validating the given access point, wherein the validating comprises validating the given location and an orientation of the given access point;

performing automatic testing of the given access point, wherein the automatic testing comprises testing communication performance of the given access point; and providing a comparison of estimated communication performance of the given access point in the radio-frequency project plan and measured communication performance of the given access point, wherein providing the comparison comprises providing a visual representation of the comparison, and the estimated communication performance is based at least in part on the radio-frequency project plan.

15. The non-transitory computer-readable storage medium of claim 14, wherein the operations comprise dynamically updating and providing a visual representation of estimated communication performance based at least in part on one or more proposed changes to the given location and/or the network.

16. The non-transitory computer-readable storage medium of claim 14, wherein performing the automatic testing comprises dynamically generating test scripts for the testing or selecting a test script from sets of predefined test scripts.

17. A method for providing installation instructions, comprising:

by an electronic device:

automatically generating a radio-frequency project plan for a network in an environment using a radio-frequency model and a model corresponding to at least a portion of the environment, wherein the radio-frequency project plan comprises a number of access points, types of the access points and locations of the access points in the environment, and wherein the model specifies a two-dimensional (2D) or three-dimensional (3D) geometric layout of the environment and/or estimated parameters associated with radio-frequency properties of at least the portion of the environment;

based at least in part on the radio-frequency project plan, interactively providing the installation instructions to an installer while a given access point in the access points is being installed in the environment, wherein providing the instructions comprises providing a digital representation of at least a portion of the environment proximate to a given location in the locations of the given access point;

after the given access point is installed, validating the given access point, wherein the validating comprises validating the given location and an orientation of the given access point;

performing automatic testing of the given access point, wherein the automatic testing comprises testing communication performance of the given access point; and providing a comparison of estimated communication performance of the given access point in the radio-frequency project plan and measured communication performance of the given access point, wherein providing the comparison comprises providing a visual representation of the comparison, and the estimated communication performance is based at least in part on the radio-frequency project plan.

18. The method of claim 17, wherein the method comprises dynamically updating and providing a visual representation of estimated communication performance based at least in part on one or more proposed changes to the given location and/or the network.

19. The method of claim 18, wherein the changes comprise receiving an instruction to switch from wired backhaul to wireless backhaul.

20. The method of claim 17, wherein performing the automatic testing comprises dynamically generating test scripts for the testing or selecting a test script from sets of predefined test scripts.

* * * * *